(12) United States Patent  
Siriwardane

(10) Patent No.: US 7,314,847 B1  
(45) Date of Patent: Jan. 1, 2008

(54) REGENERABLE SORBENTS FOR $CO_2$ CAPTURE FROM MODERATE AND HIGH TEMPERATURE GAS STREAMS

(75) Inventor: Ranjani V. Siriwardane, Morgantown, WV (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 379 days.

(21) Appl. No.: 10/969,674

(22) Filed: Oct. 21, 2004

(51) Int. Cl.
*B01J 20/00* (2006.01)
*B01J 20/02* (2006.01)
*B01J 20/04* (2006.01)
*B01J 20/10* (2006.01)

(52) U.S. Cl. ............... 502/400; 502/410; 502/411; 502/514; 502/518; 423/230; 95/139

(58) Field of Classification Search ............. 502/400, 502/411, 427, 514, 518, 410; 95/139; 423/230
See application file for complete search history.

(56) References Cited

U.S. PATENT DOCUMENTS

| | | | | |
|---|---|---|---|---|
| 2,865,867 A | * | 12/1958 | Dyke et al. ............... | 502/9 |
| 3,065,054 A | * | 11/1962 | Haden, Jr. et al. ........ | 423/701 |
| 3,684,712 A | * | 8/1972 | Bovard ..................... | 502/411 |
| 4,039,620 A | * | 8/1977 | Netteland et al. .......... | 423/230 |
| 4,433,981 A | * | 2/1984 | Slaugh et al. ............. | 95/139 |
| 4,964,889 A | * | 10/1990 | Chao ........................ | 95/96 |
| 5,214,019 A | * | 5/1993 | Nalette et al. ............. | 502/400 |
| 5,480,625 A | * | 1/1996 | Nalette et al. ............. | 423/230 |
| 5,917,136 A | | 6/1999 | Gaffney et al. | |
| 6,280,503 B1 | * | 8/2001 | Mayorga et al. ............ | 95/96 |
| 6,322,612 B1 | | 11/2001 | Sircar et al. | |
| 7,045,483 B2 | * | 5/2006 | Noda et al. ................ | 502/243 |

FOREIGN PATENT DOCUMENTS

JP    3-245811 A  * 11/1991

* cited by examiner

*Primary Examiner*—Timothy C. Vanoy
(74) *Attorney, Agent, or Firm*—Joy Alwan; Mark P. Dvorscak; Paul A. Gottlieb

(57) ABSTRACT

A process for making a granular sorbent to capture carbon dioxide from gas streams comprising homogeneously mixing an alkali metal oxide, alkali metal hydroxide, alkaline earth metal oxide, alkaline earth metal hydroxide, alkali titanate, alkali zirconate, alkali silicate and combinations thereof with a binder selected from the group consisting of sodium ortho silicate, calcium sulfate dihydrate ($CaSO_4 \cdot 2H_2O$), alkali silicates, calcium aluminate, bentonite, inorganic clays and organic clays and combinations thereof and water; drying the mixture and placing the sorbent in a container permeable to a gas stream.

5 Claims, 21 Drawing Sheets

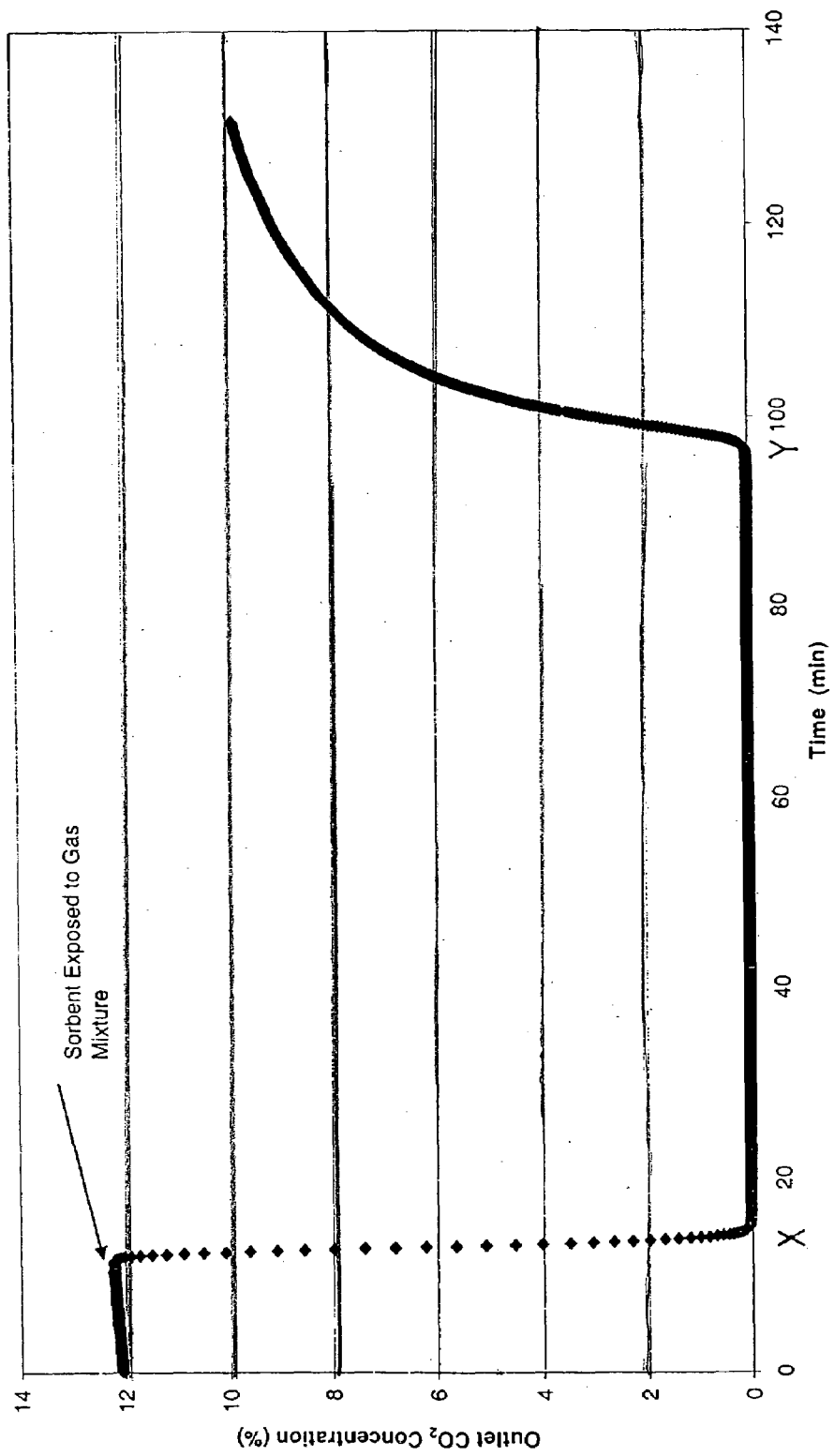
Figure 1: Sorption of $CO_2$ from Simulated IGCC Gas Stream (12% $CO_2$, 35.9% CO, 27.1% $H_2$, 25% He, saturated with $H_2O$, 5cc/min) on Sorbent A at 315°C, 1 atm, Cycle 1

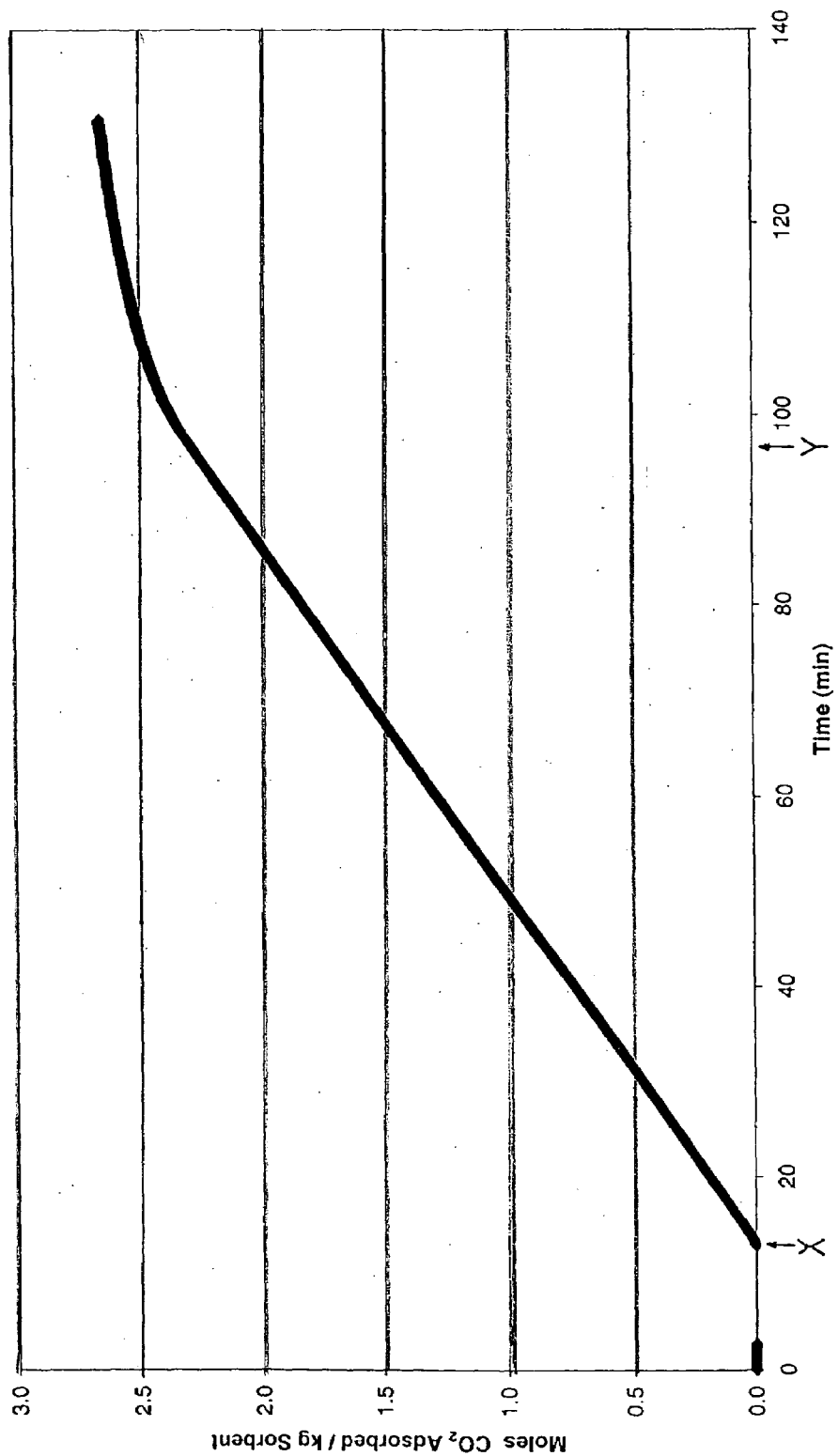
Figure 2: Sorption of $CO_2$ from Simulated IGGC Gas Stream (12% $CO_2$, 35.9% CO, 27.1% $H_2$, 25% He, saturated with $H_2O$, 5cc/min) on Sorbent A at 315°C, 1 atm, Cycle 1

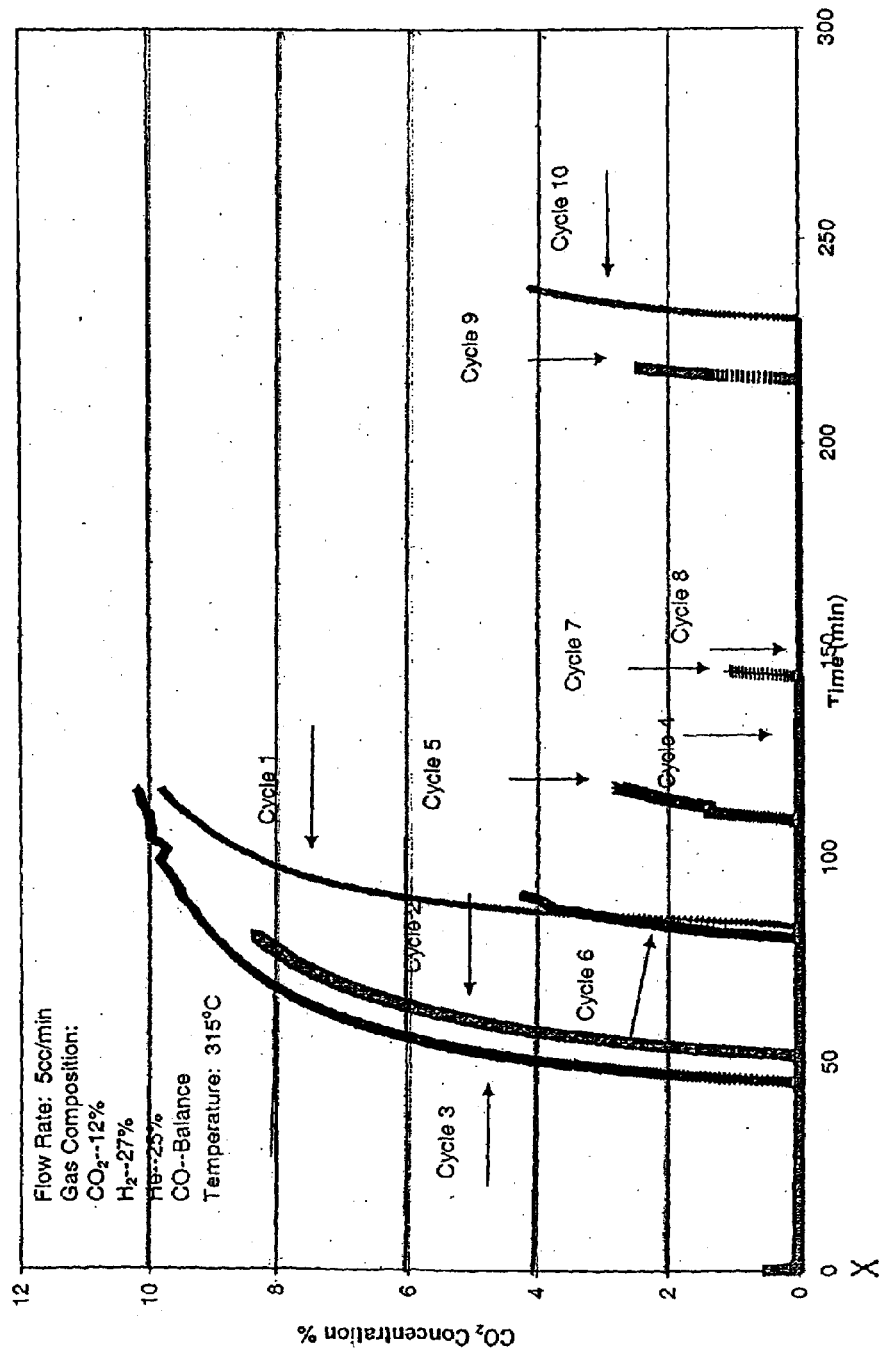

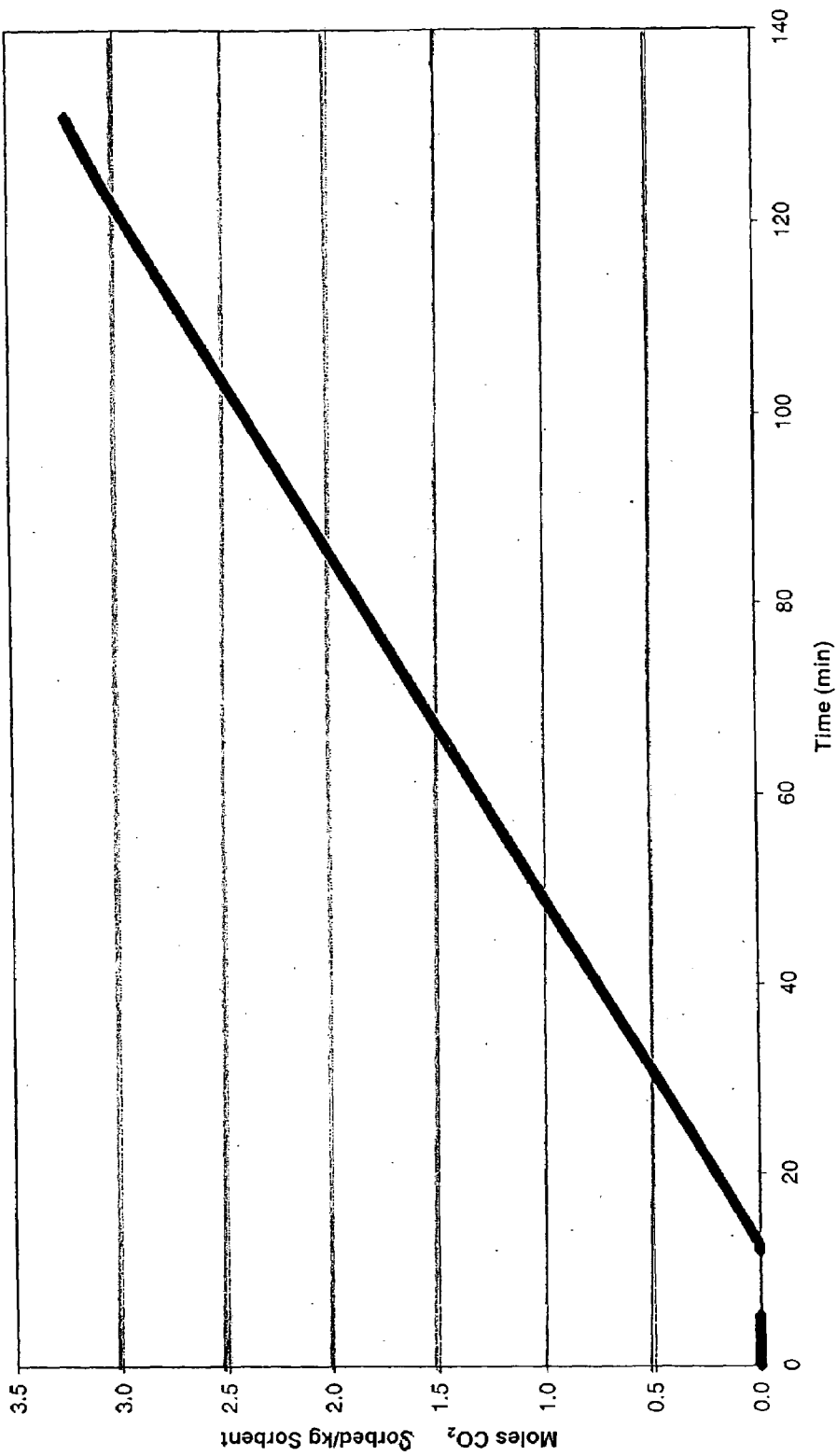
Figure 4: Sorption of $CO_2$ from Simulated IGCC Gas Stream (12% $CO_2$, 35.9% CO, 27.1% $H_2$, 25% He, saturated with $H_2O$, 5cc/min) on Sorbent A at 315°C, 1 atm, Cycle 5

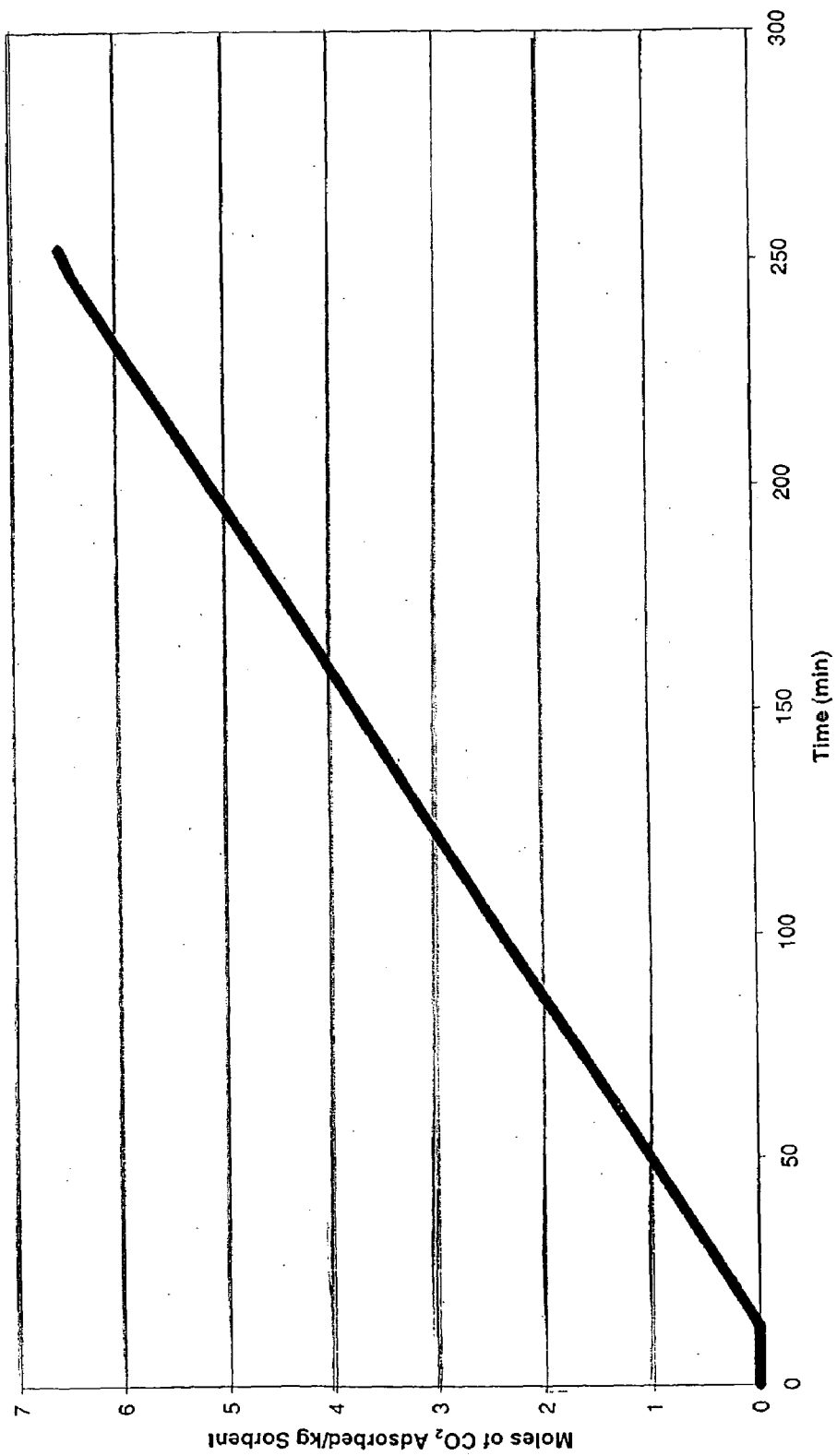

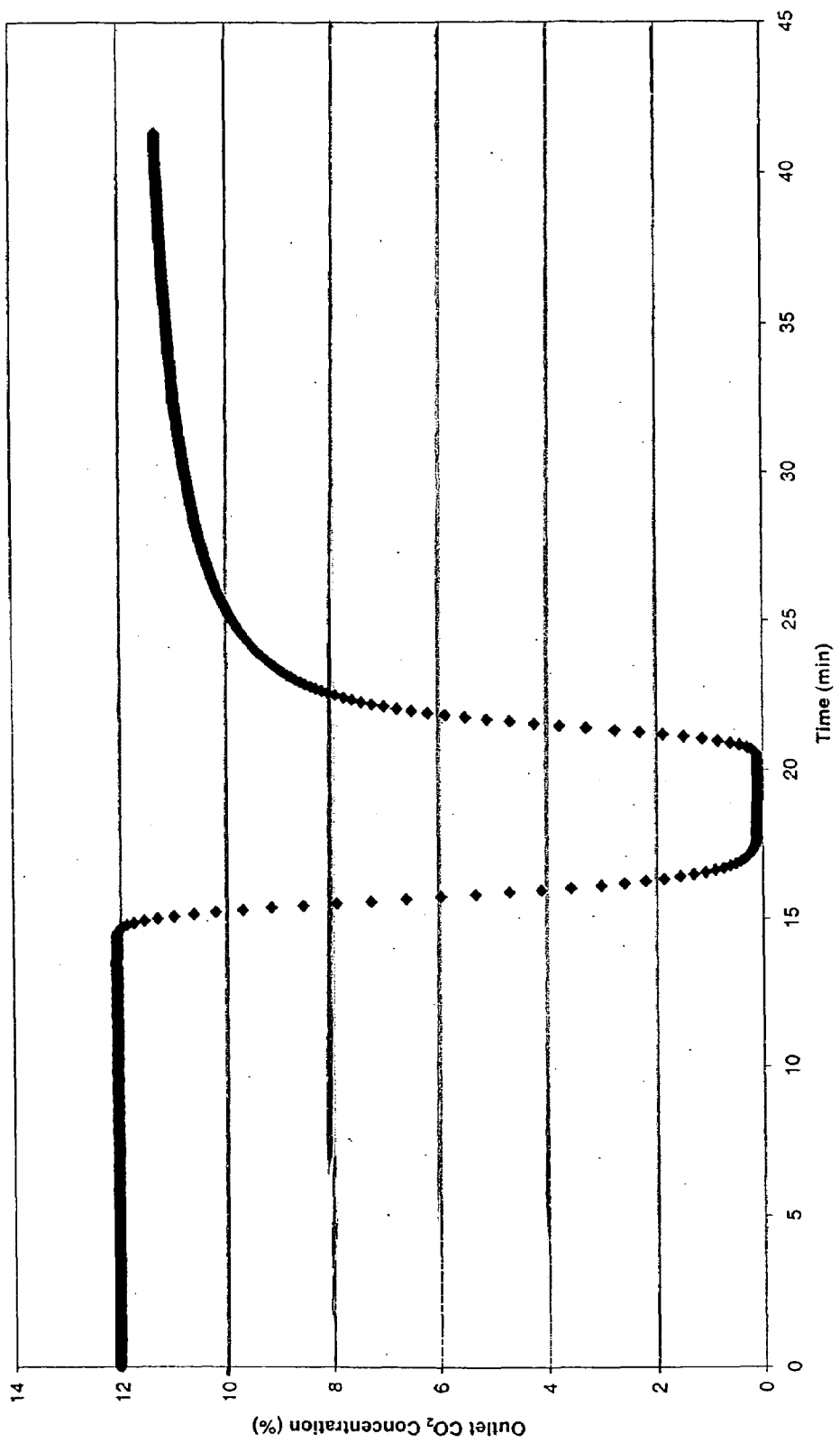
Figure 6: Sorption of $CO_2$ from Simulated IGCC Gas Stream (12% $CO_2$, 35.9% CO, 27.1% $H_2$, 25% He, saturated with $H_2O$, 5cc/min) on CaO at 315°C, 1 atm

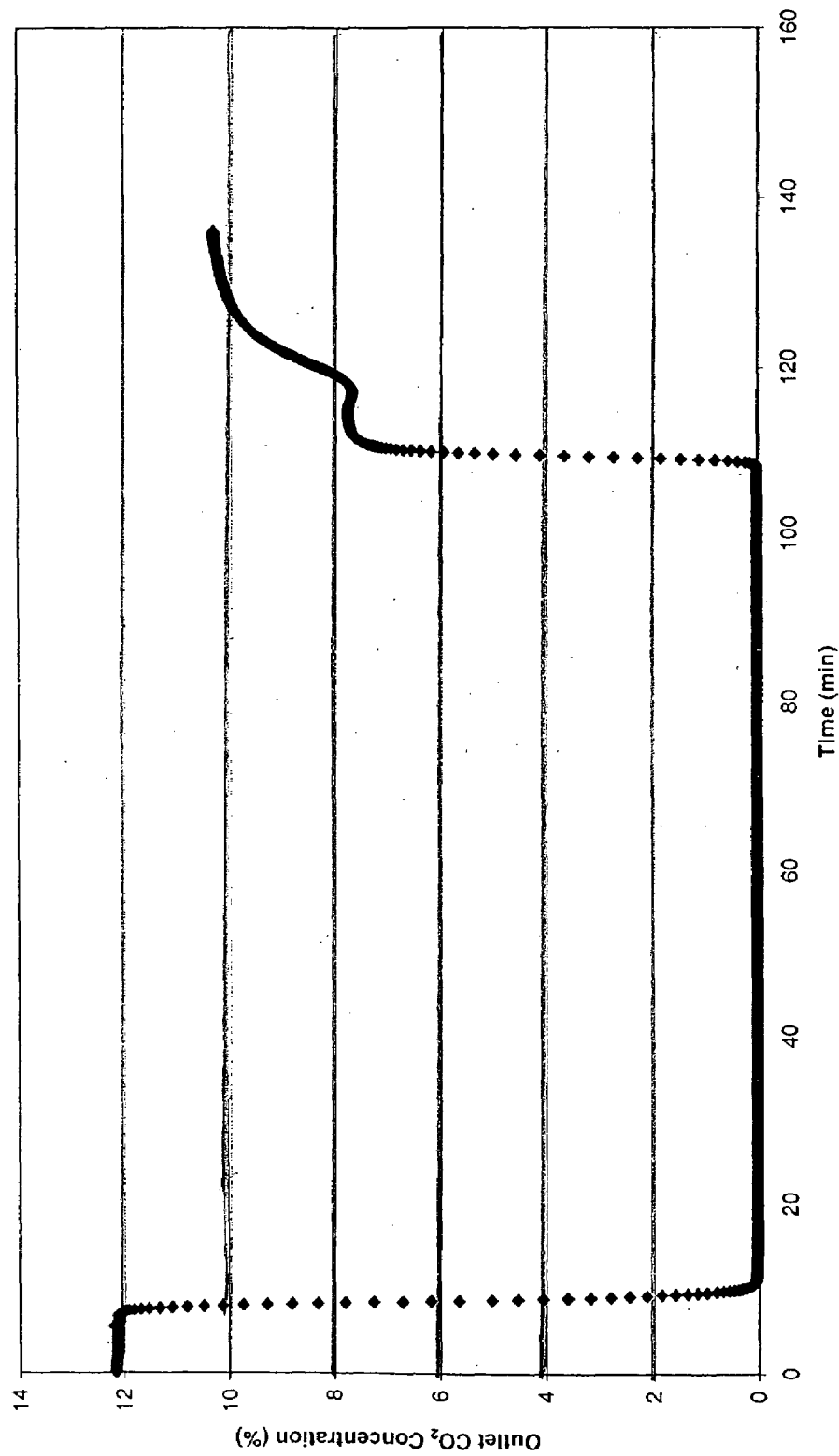

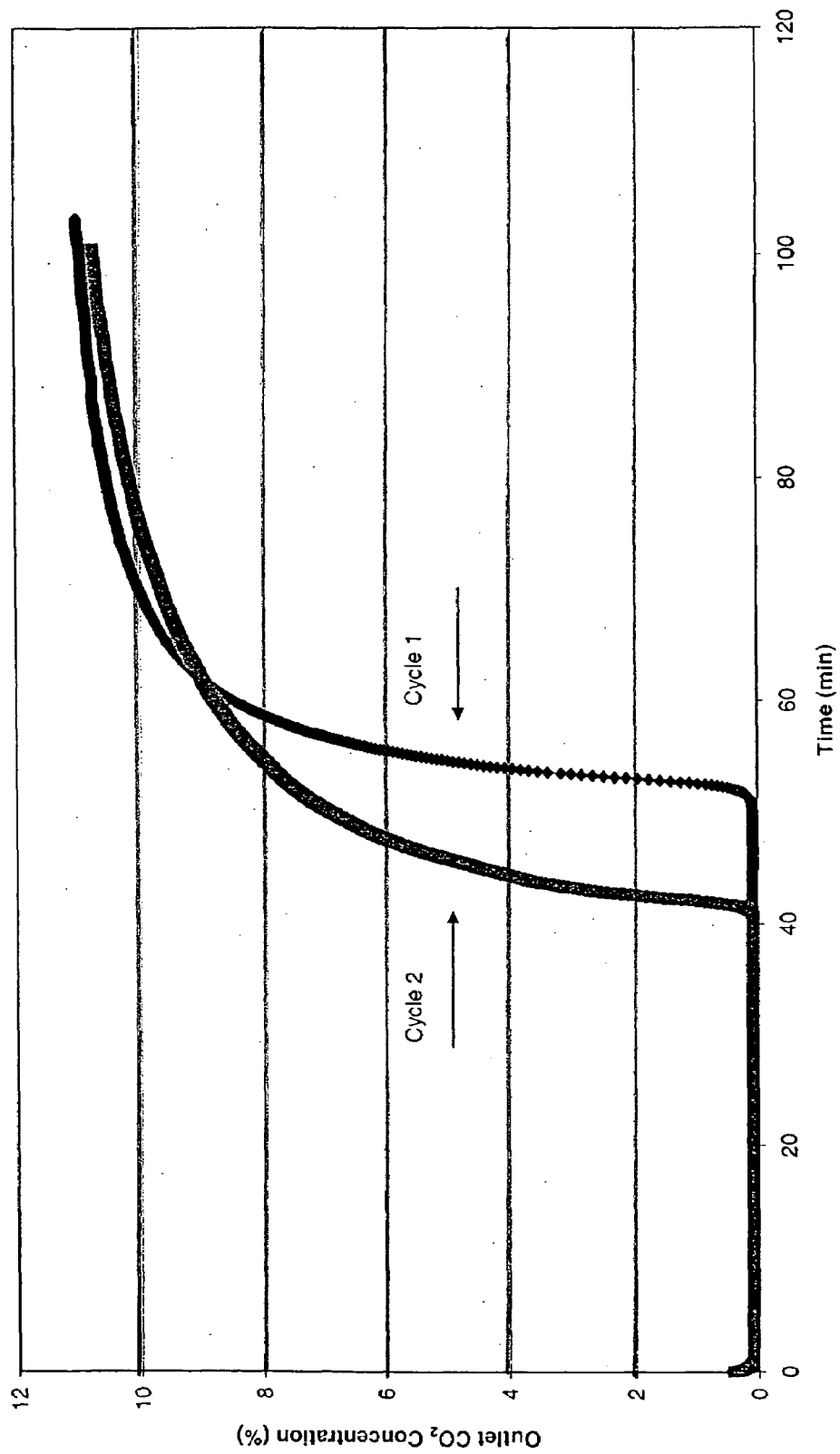
Figure 8: Sorption of $CO_2$ from Simulated IGCC Gas Stream (12% $CO_2$, 35.9% CO, 27.1% $H_2$, 25% He, saturated with $H_2O$, 5cc/min) on Sorbent B at 315°C, 1 atm

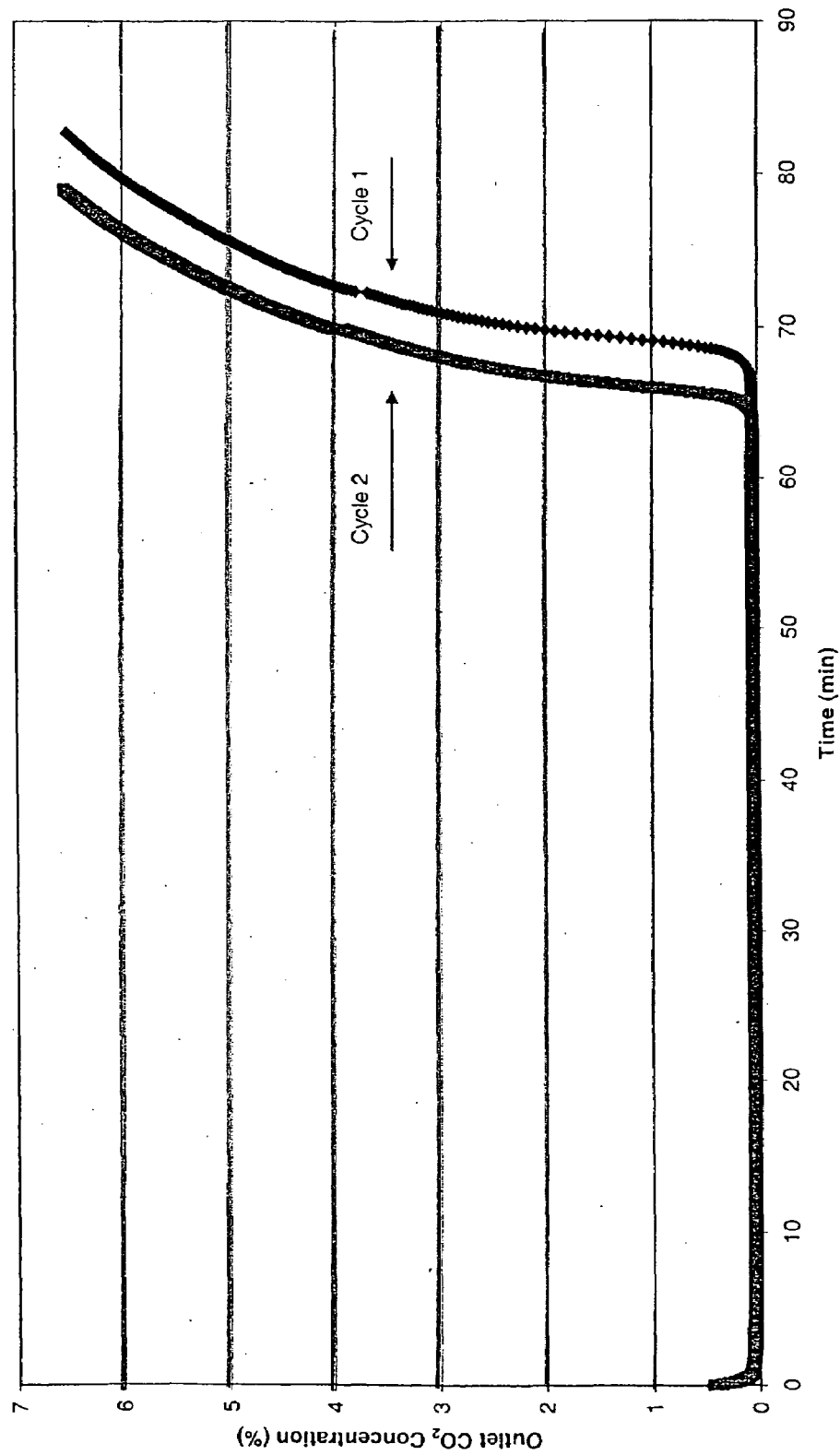
Figure 9: Sorption of $CO_2$ from Simulated IGCC Gas Stream (12% $CO_2$, 35.9% CO, 27.1% $H_2$, 25% He, saturated with $H_2O$, 5cc/min) on Sorbent C at 315°C, 1 atm

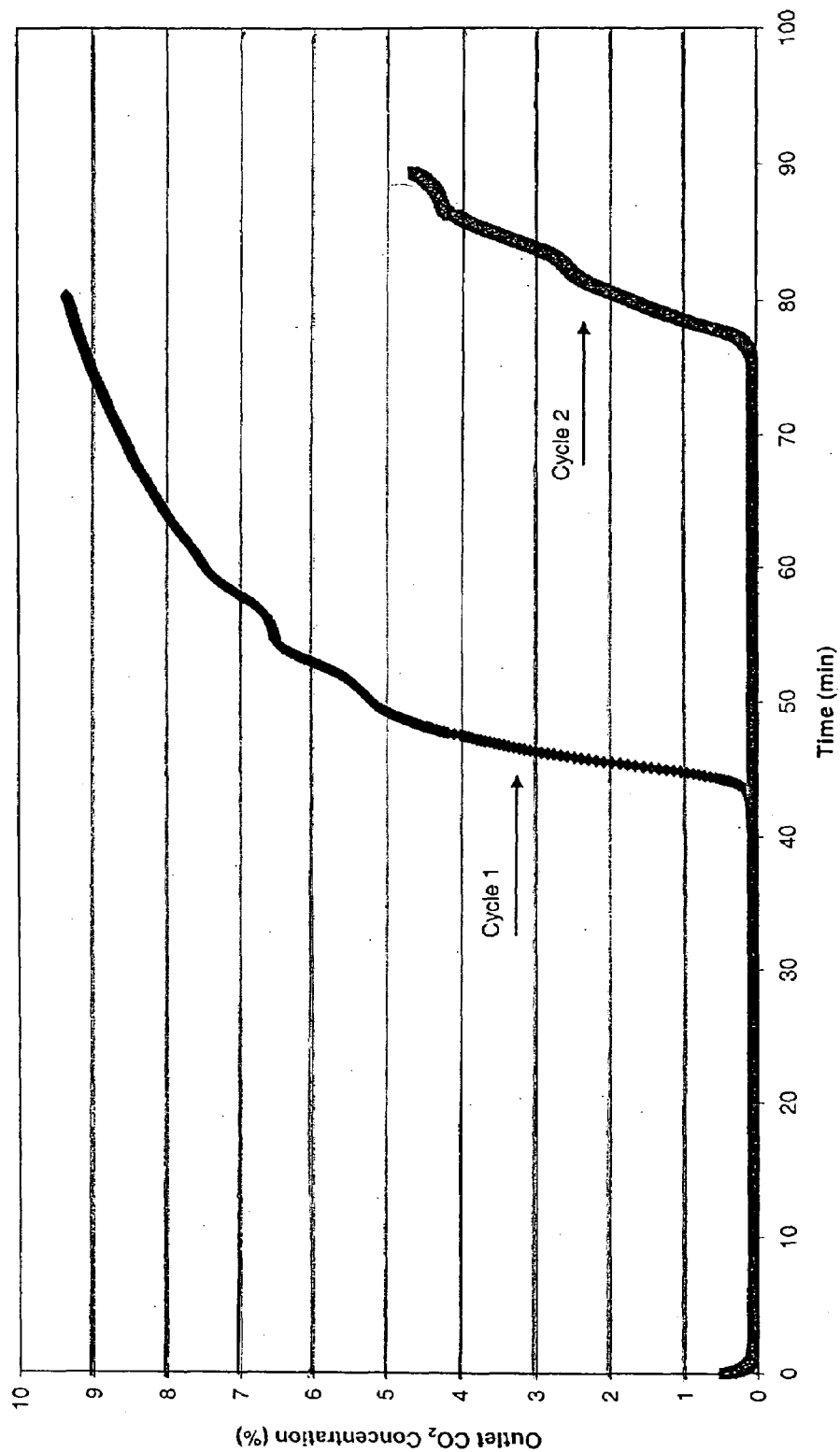
Figure 10: Sorption of CO$_2$ from Simulated IGCC Gas Stream (12% CO$_2$, 35.9% CO, 27.1% H2, 25% He, saturated with H$_2$O, 5cc/min) on Sorbent D at 315°C, 1 atm

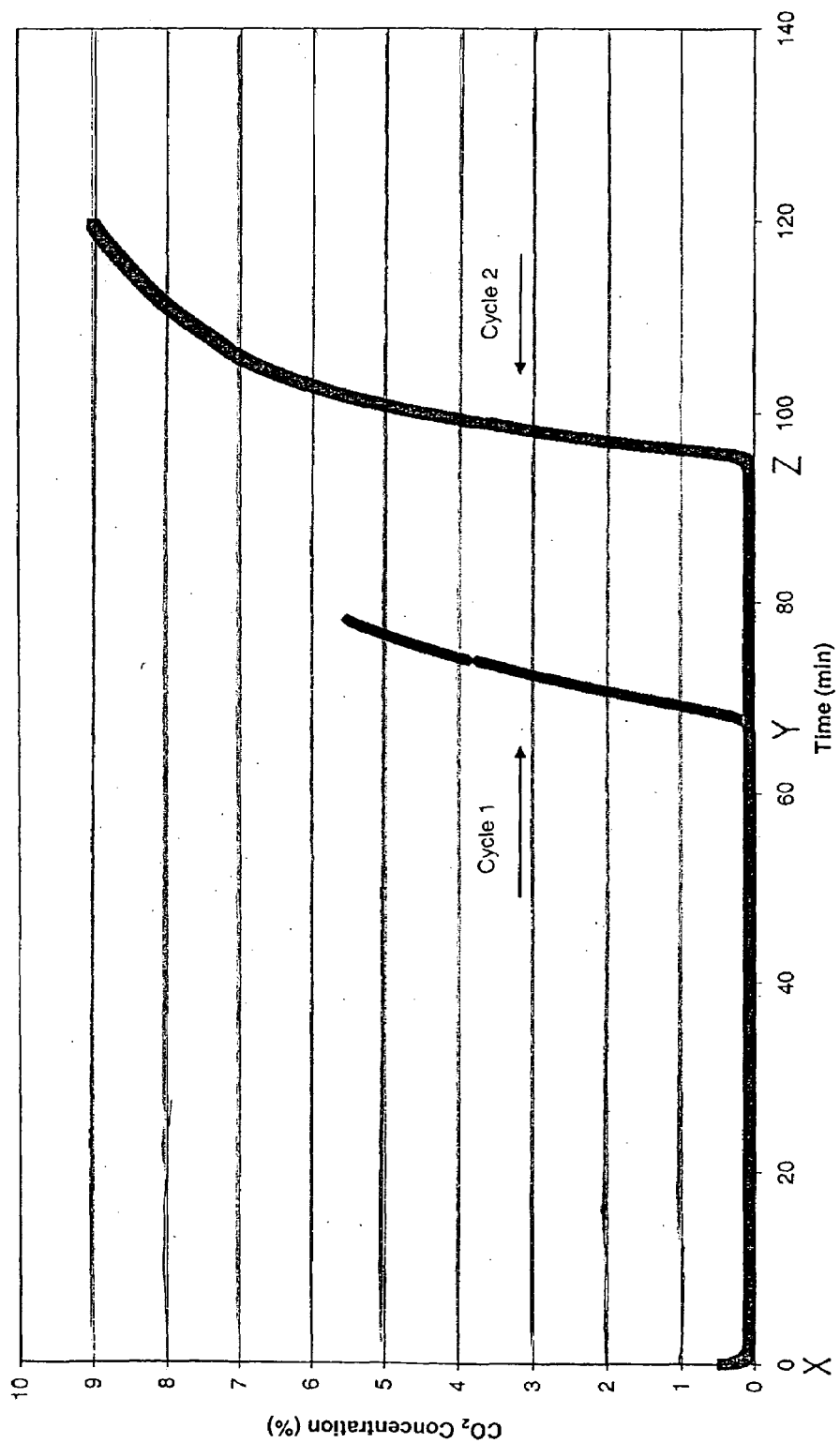
Figure 11: Sorption of $CO_2$ from Simulated IGCC Gas Stream (12% $CO_2$, 35.9% CO, 27.1% $H_2$, 25% He, saturated with $H_2O$, 5cc/min) on Sorbent E at 315°C, 1 atm

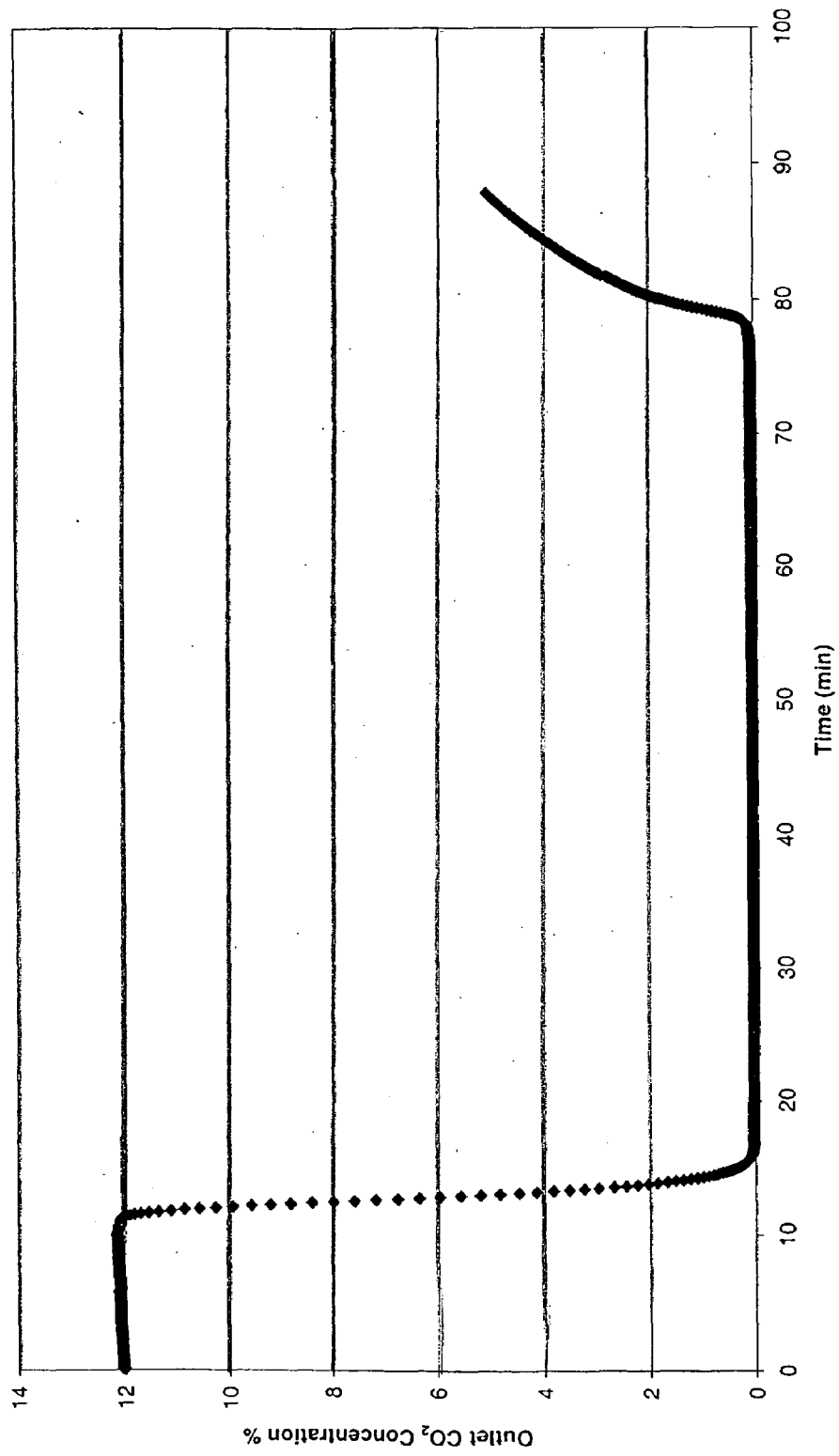
Figure 12: Sorption of $CO_2$ from Simulated IGCC Gas Stream (12% $CO_2$, 35.9% CO, 27.1% $H_2$, 25% He, saturated with $H_2O$, 5cc/min) on Sorbent E at 500°C, 1 atm

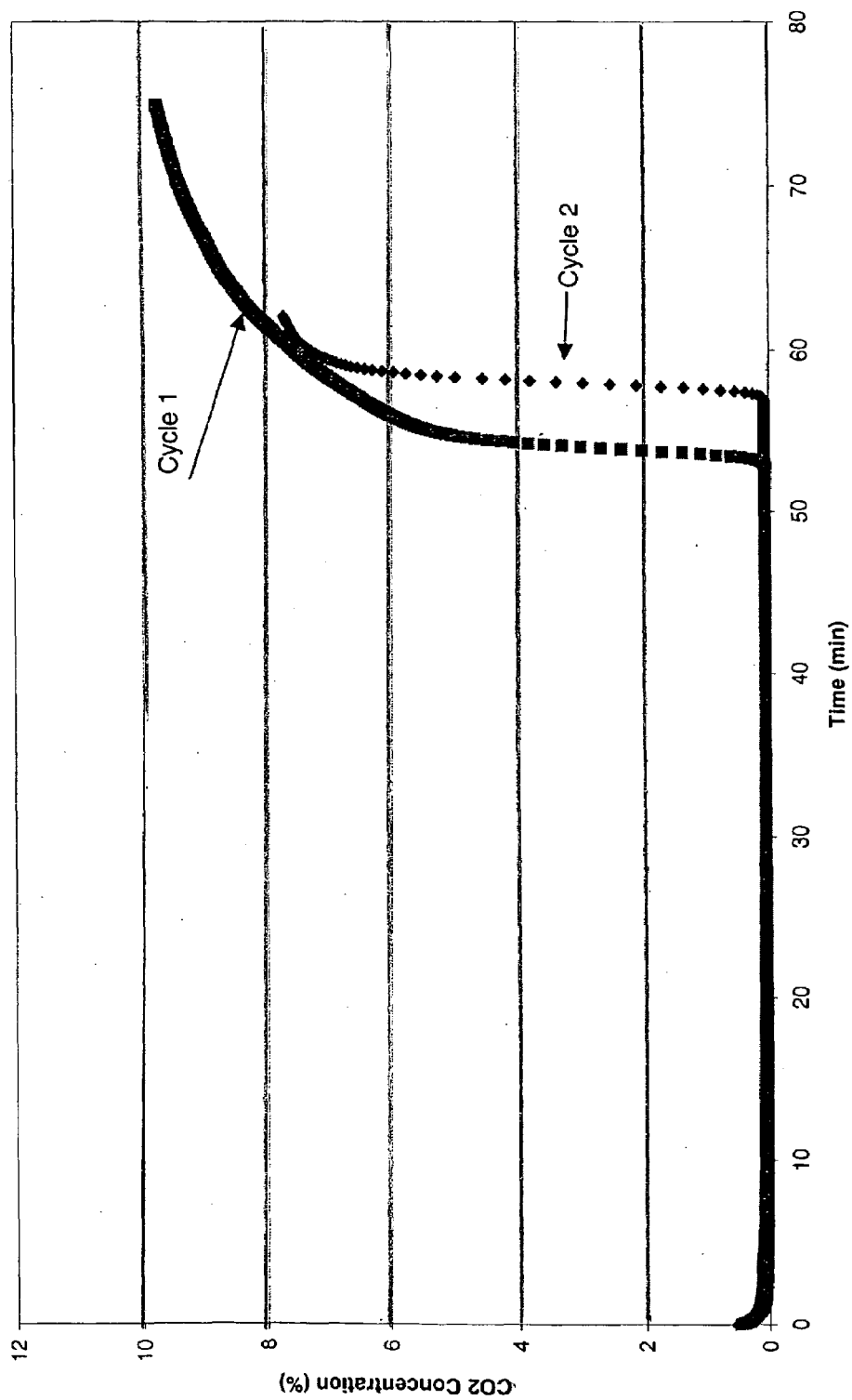
Figure 13 - CO$_2$ Sorption of sorbent F (CSOH/CaO) at 315 C

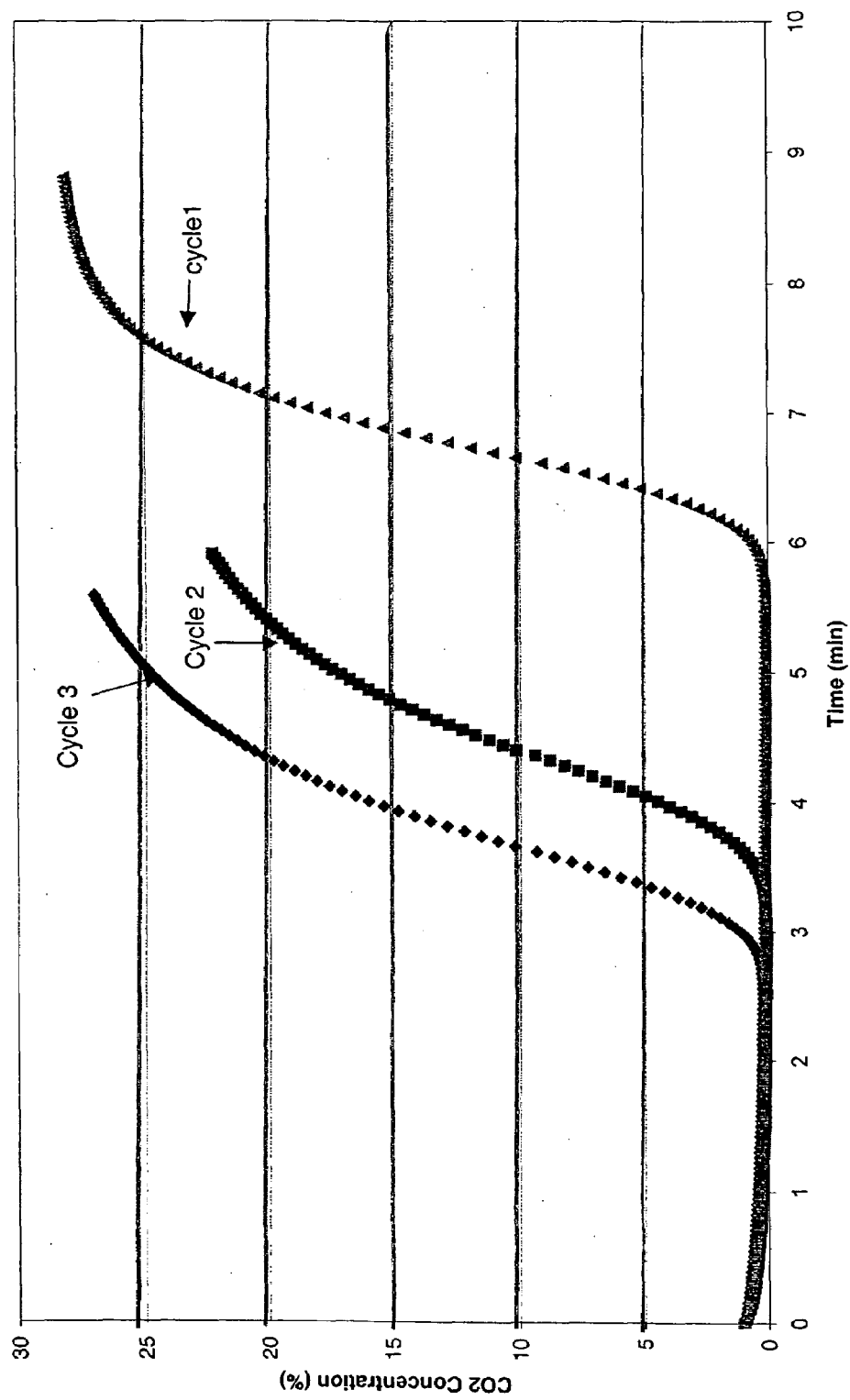

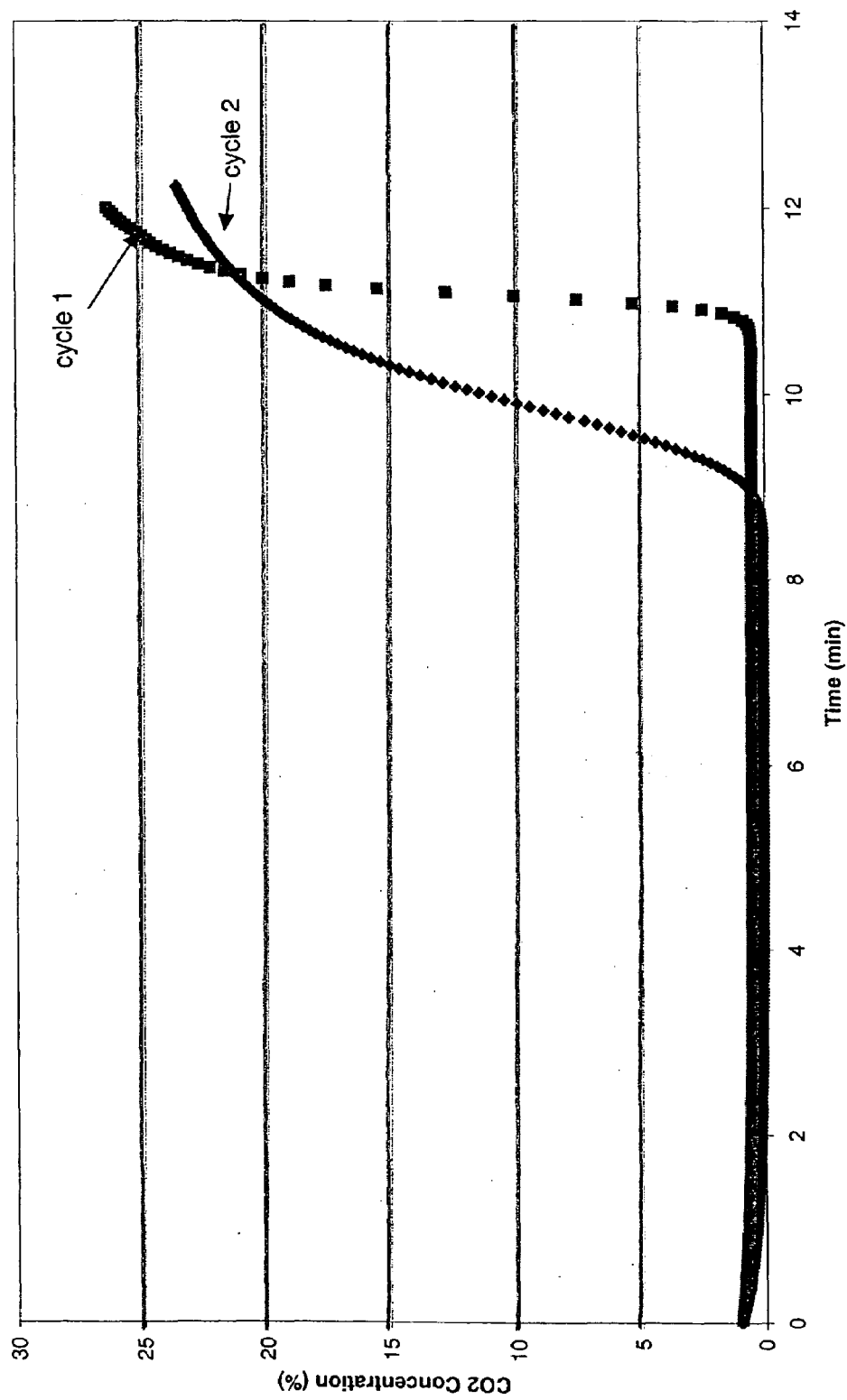
Figure 15 - CO2 Sorption on Sorbent H ($Mg(OH)_2$/sodium ortho silicate (10:1)) at 100 °C

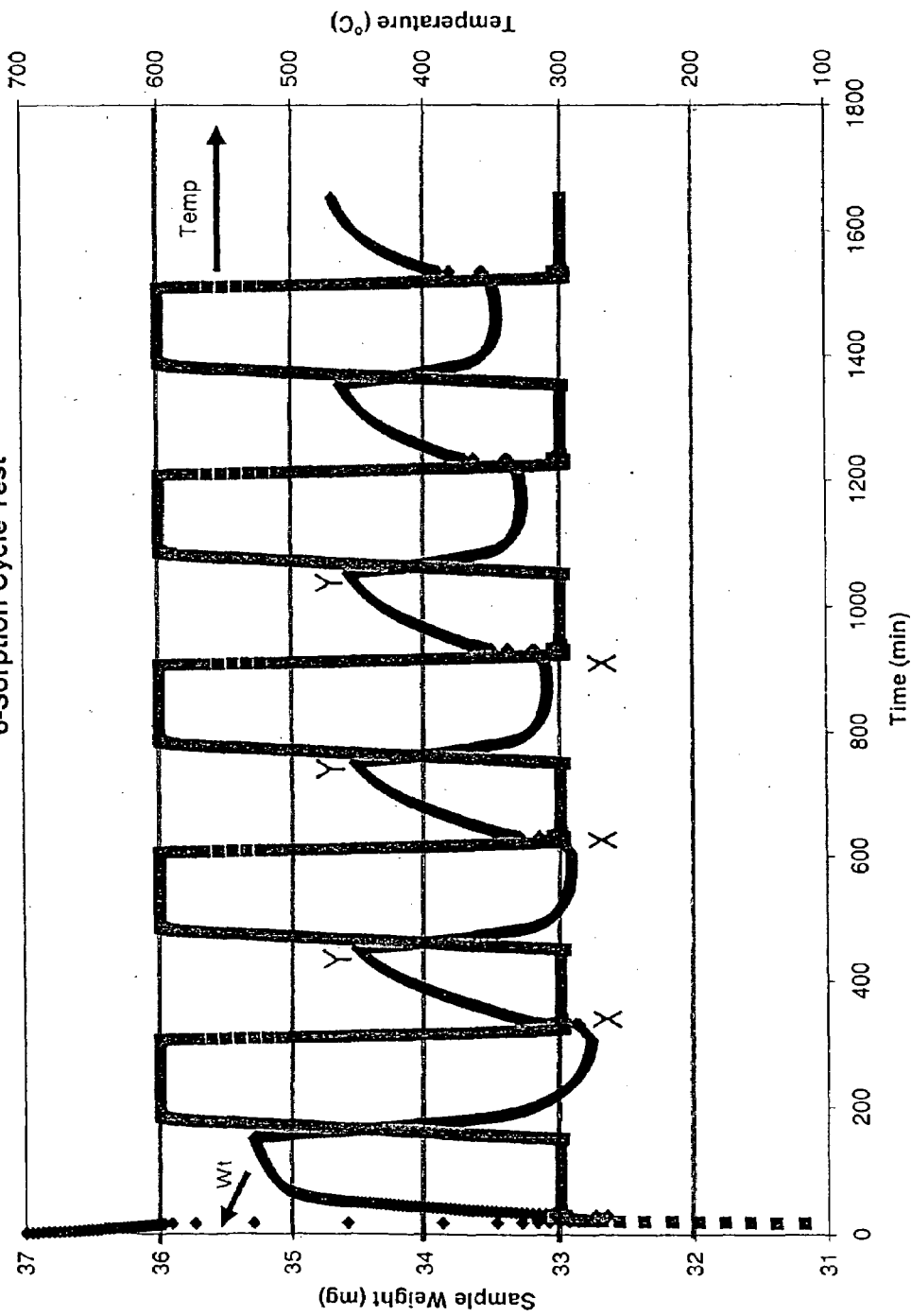
Figure 16: Thermogravimetric Data for CO$_2$ Sorption on Sodium Titanate 6-Sorption Cycle Test

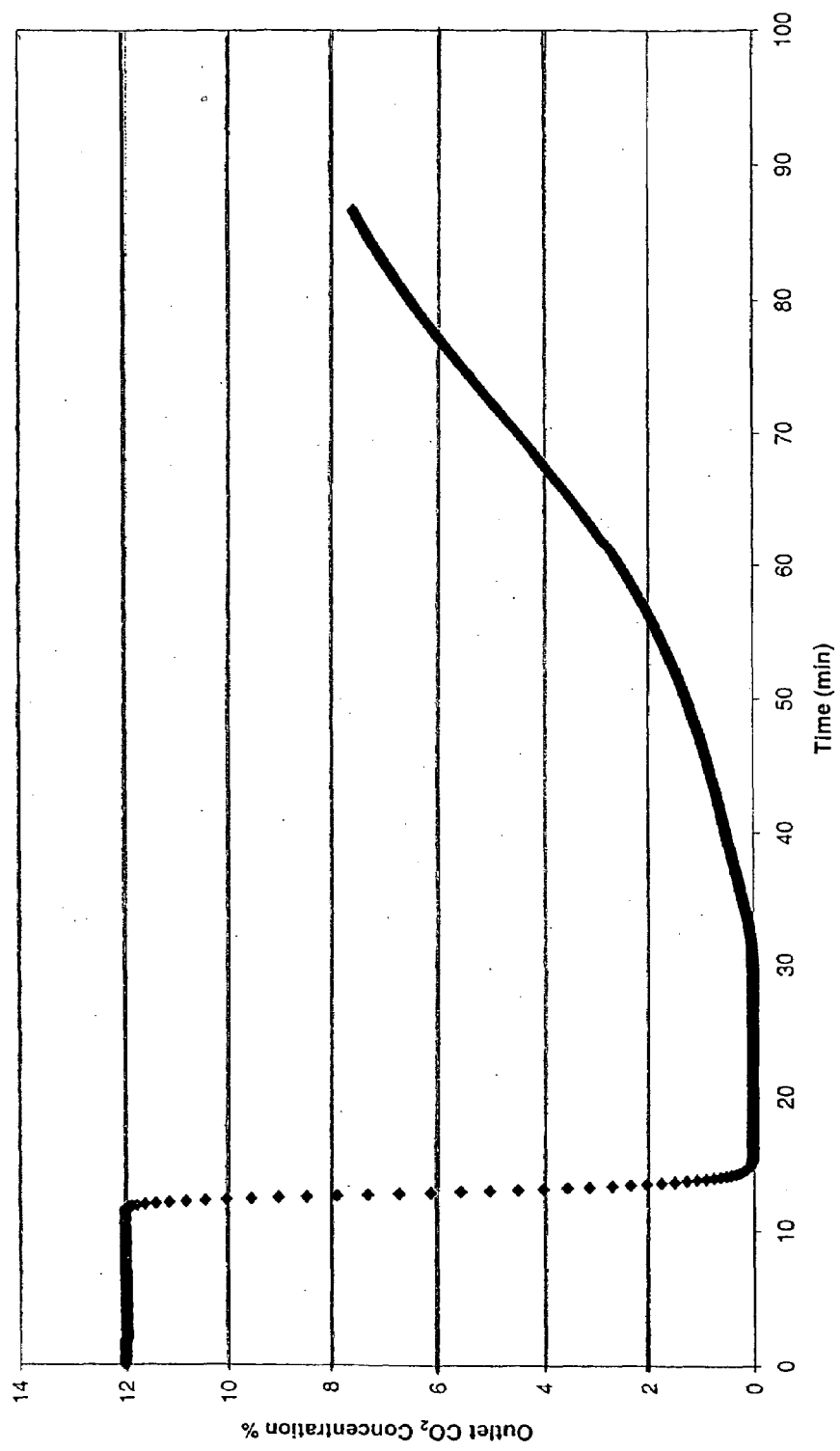
Figure 17 Sorption of $CO_2$ from Simulated IGCC Gas Stream (12% $CO_2$, 35.9% CO, 27.1% $H_2$, 25% He, saturated with $H_2O$, 5cc/min) on Sodium Titanate at 500°C, 1 atm

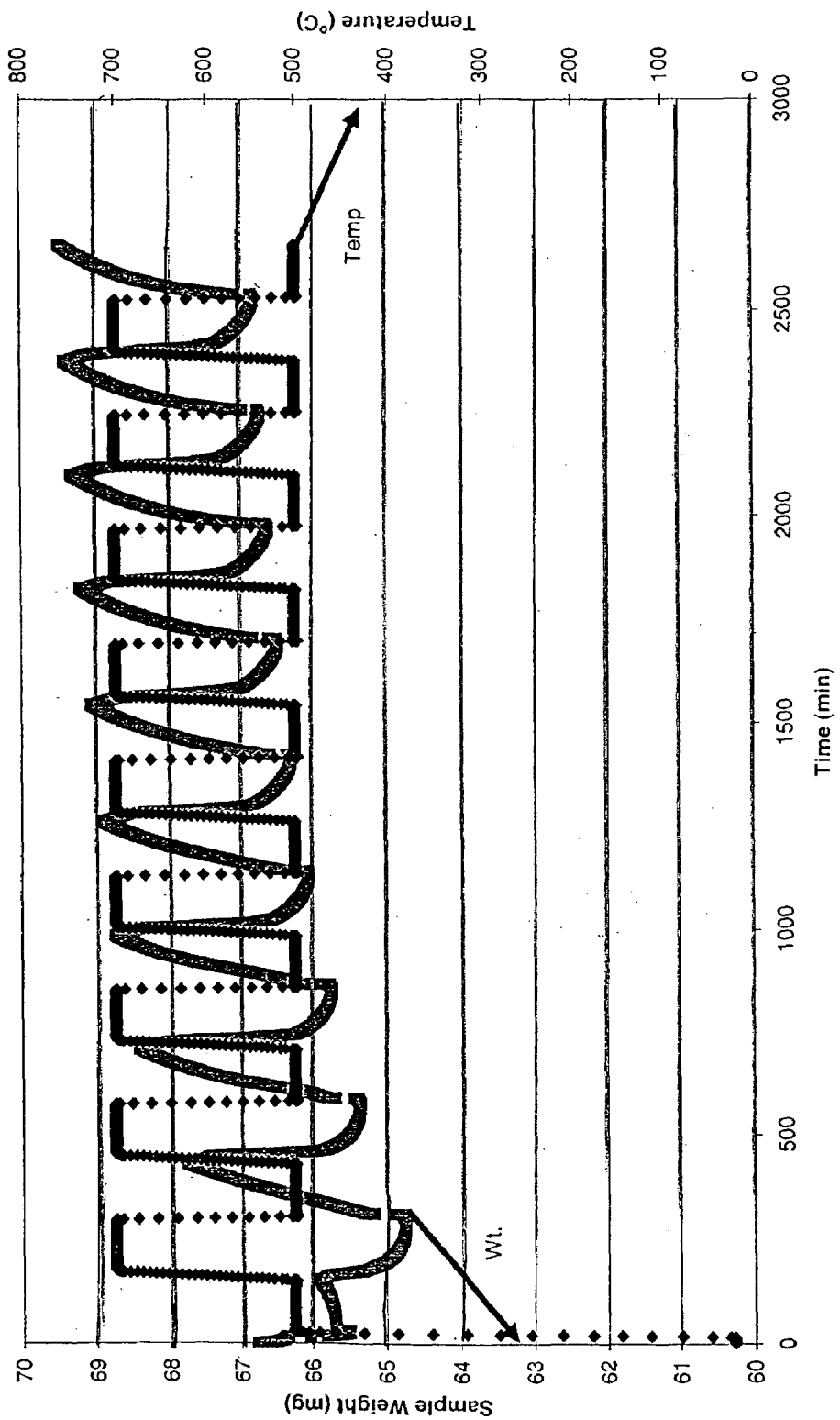
Figure 18: Thermogravimetric Data for CO$_2$ Sorption on Sodium Zirconium Oxide 6-Sorption Cycle Test

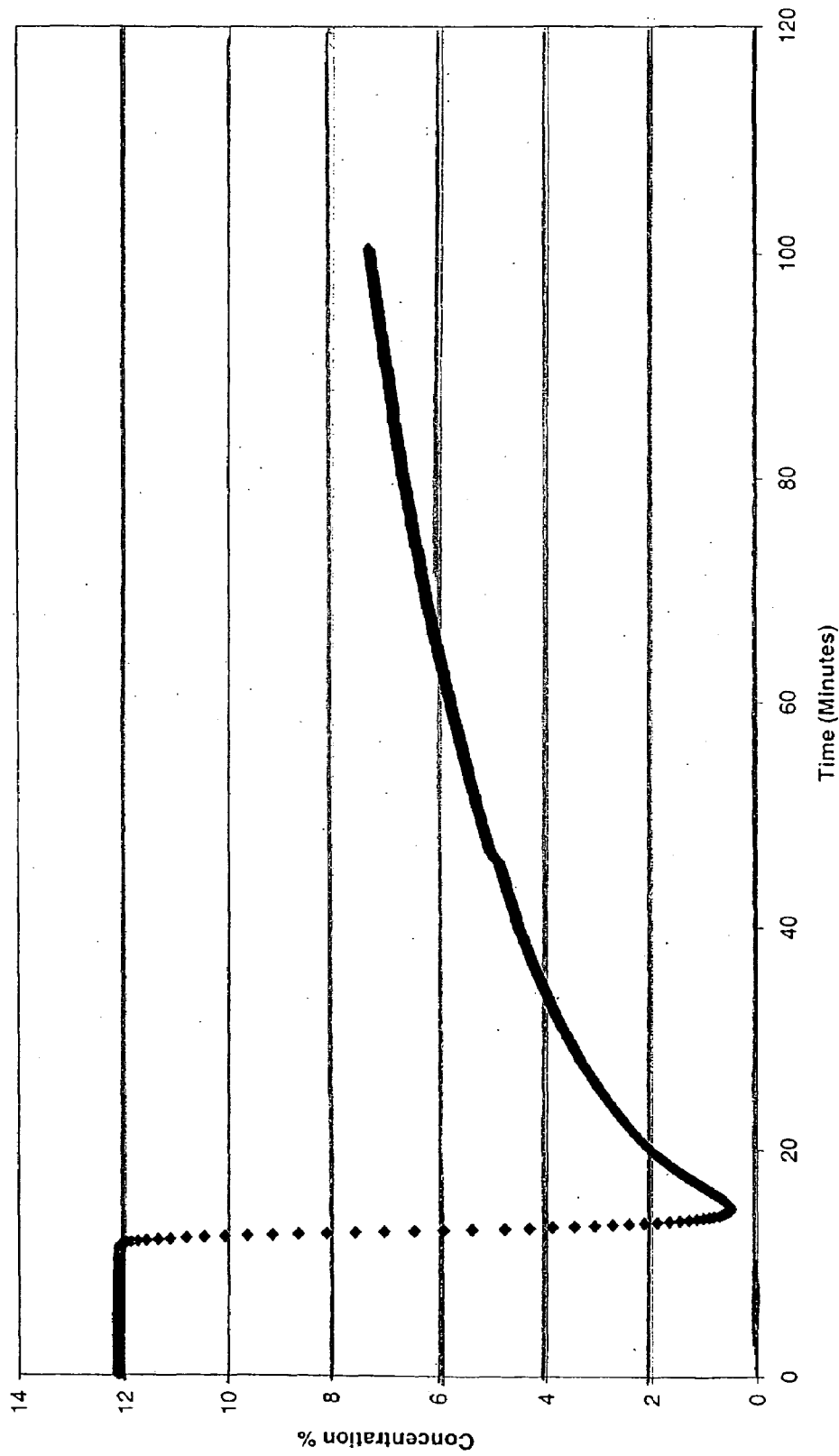
Figure 19: Sorption of $CO_2$ from Simulated IGGC Gas Stream (12% $CO_2$, 35.9% CO, 27.1% $H_2$, 25% He, saturated with $H_2O$, 5cc/min) on Sodium Zirconium Oxide at 315°C, 1 atm

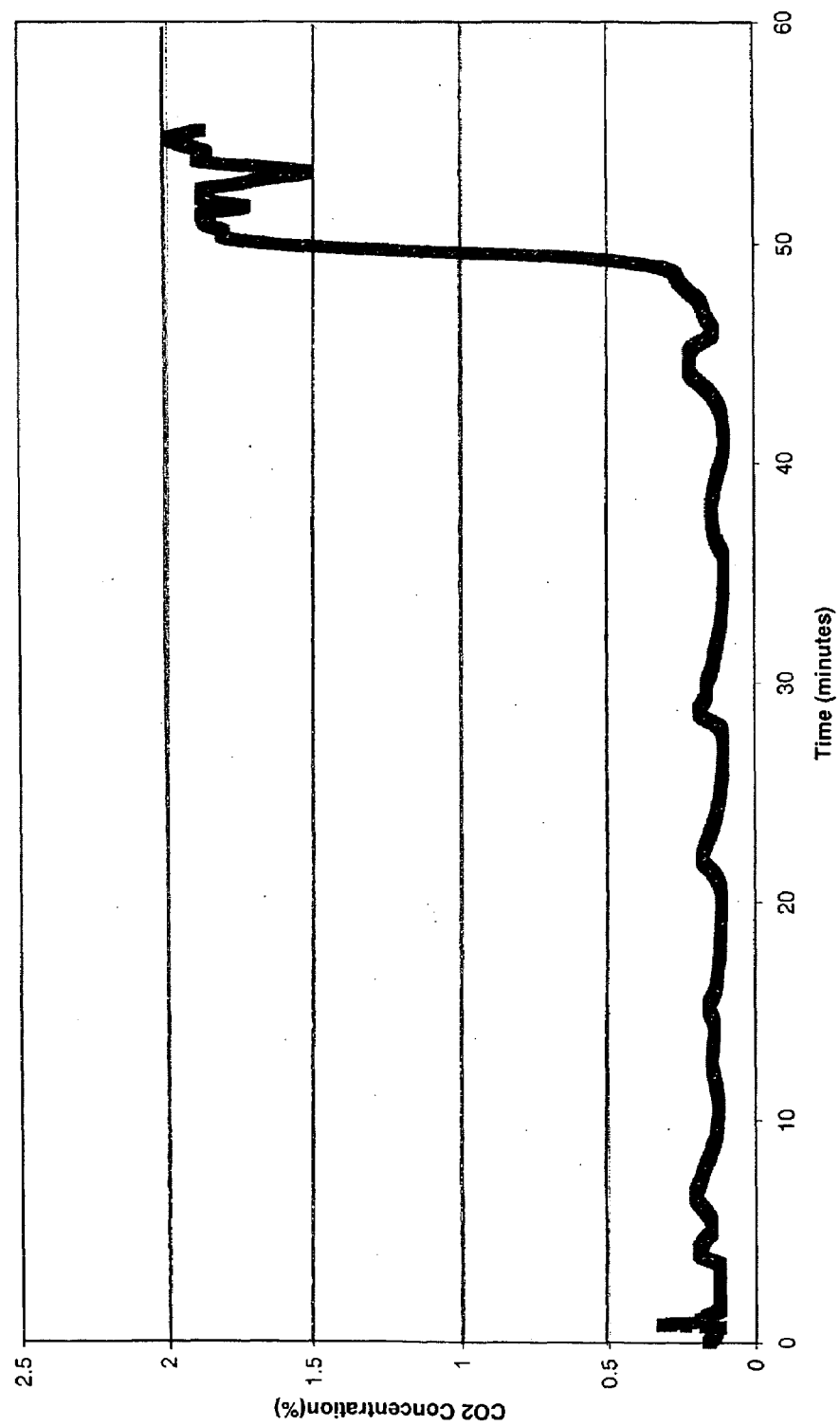

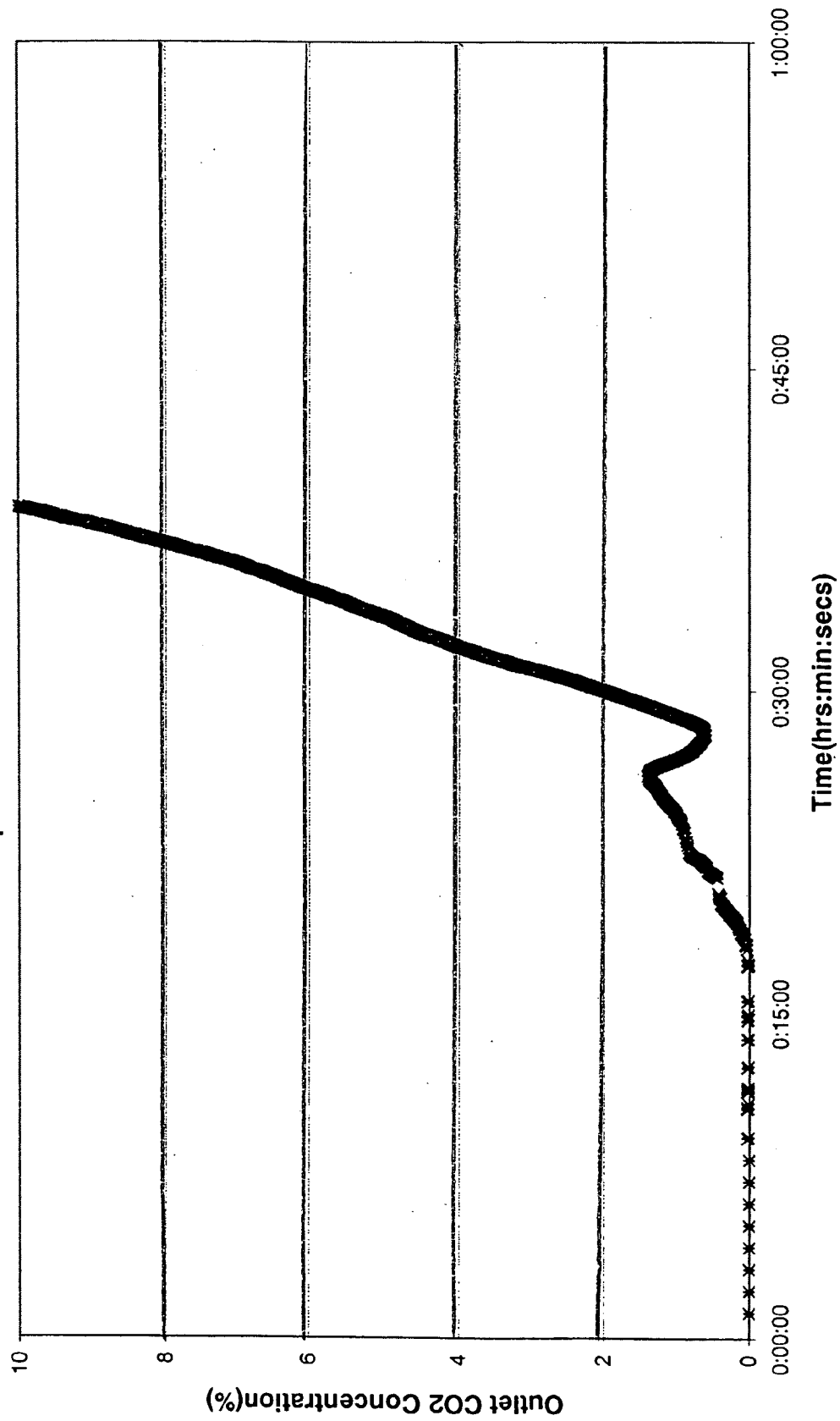

REGENERABLE SORBENTS FOR $CO_2$ CAPTURE FROM MODERATE AND HIGH TEMPERATURE GAS STREAMS

CONTRACTUAL ORIGIN OF INVENTION

The United States Government has rights in this invention pursuant to an employer-employee agreement between The U.S. Department of Energy and The National Energy Technology Laboratory.

BACKGROUND OF THE INVENTION

1. Field of the Invention

This invention relates to a method for the preparation of sorbents for treatment of industrial effluent gases, and, more specifically, this invention relates to a method for producing sorbents to aid in the removal of carbon dioxide ($CO_2$) from the atmosphere or from other sources such as power plants.

2. Background of the Invention

Fossil fuels supply more than 98 percent of the world's energy requirements. The combustion of fossil fuels, however, is one of the major sources of the greenhouse gas, $CO_2$. The ability to efficiently and safely absorb $CO_2$ is important in the development and application of cost-effective technologies for $CO_2$ removal from gas streams.

Separation and capture processes of $CO_2$, as those processes relate to ocean and/or geologic sequestration, have been identified as a high-priority topic in the government.

The costs of separation and capture, including compression to the required $CO_2$ pressure for the sequestration step, are generally estimated to comprise about three-fourths of the total cost of ocean or geologic sequestration. An improvement of the separation and capture of $CO_2$ will reduce the total cost required for sequestration.

$CO_2$ absorption processes using aqueous amine solutions facilitate the removal of $CO_2$ from, gas streams in some industries. These processes often are referred to as wet chemical stripping.

Wet chemical stripping of $CO_2$ involves one or more reversible chemical reactions between $CO_2$ and amine substances to produce a liquid species, such as a carbamate. Upon heating, the carbamate breaks down to free. $CO_2$ with the original amine regenerated to subsequently react with additional $CO_2$.

Typically, the amines, monoethanolamine (MEA) and diethanolamine (DEA), are used as 25 to 30 wt. % amine in aqueous solution. The amine solution enters the top of an absorption tower while the carbon dioxide containing gaseous stream is introduced at the bottom. During contact with the $CO_2$-containing gaseous stream, the amine solution chemically absorbs the $CO_2$ from the gaseous stream to create a carbamate. Conversion of carbamate ion back to $CO_2$ proceeds through a thermal regeneration process, typically at a temperature of about 120° C. Carbon dioxide and water emerge from the amine solution and the water is separated via condensation using a heat exchanger. After regeneration, the amine solution is recycled back to the absorption tower for additional $CO_2$ absorption.

Carbon dioxide capture in the above-described manner is energy intensive. In addition, the amine process is restricted to $CO_2$ capture at ambient temperatures. Further, the amine solution has a limited lifetime due to degradation through oxidation of the amine. In addition, high amine concentrations and high $CO_2$ loadings exacerbate corrosion problems of process equipment. The $CO_2$ capture capacity of commercial amine processes is about 0.68 mole/kg. Since the capacity is low, either large reactors or frequent regeneration is necessary.

$CO_2$ capture capacity via the Selexol process is about 0.16 mole/kg. The Selexol process utilizes dimethylether of polyethylene glycol as a solvent for the physical absorption of carbon dioxide at high carbon dioxide pressures. The solvent is regenerated using pressure reduction. Current commercial processes for $CO_2$ removal, such as the Selexol process, require cooling of the gases to ambient temperature before utilization of said processes.

Solid sorbents serve as alternatives to $CO_2$ capture utilizing liquids. For example, pressure swing adsorption-absorption/temperature swing adsorption-absorption (PSA/PTA) processes are more suitable for $CO_2$ capture from coal gasification.

PSA/PTA systems can be even more energy efficient for $CO_2$ capture in integrated gasification combined cycle (IGCC) processes, if only the sorbents were operational at moderate or high temperatures. Currently, water-gas shift reactors in IGCC processes elevate gas streams to 300° C., so as to convert IGCC gas to $CO_2$, $H_2$, and steam. These gases must be cooled before currently available $CO_2$ removal technology can be used.

Thus, there are considerable advantages of developing sorbents for $CO_2$ capture at moderate to hot gas temperatures inasmuch as the hot gas remaining after $CO_2$ removal can be directly introduced to the turbine systems. If $CO_2$ can be removed from the gas stream directly after the water-gas shift reactor, a pure $H_2$ stream can be obtained at high temperatures for various applications. Aside from use in IGCC applications, sorbents for moderate to hot gas temperatures also can be useful for chemical and metallurgical applications. Yet, there are no known regenerable sorbents which can be used easily and effectively for $CO_2$ capture at the temperature range of 100° C. to 500° C.

U.S. Pat. No. 6,322,612 awarded to Sircar, et al. on Nov. 27, 2001 discloses a process for the removal of bulk carbon dioxide from wet, high-temperature gases.

U.S. Pat. No. 5,917,136 awarded to Gaffney, et al. on Jun. 29, 1999 discloses a carbon dioxide pressure swing adsorption process using modified alumina adsor-bents. $CO_2$ sorption capacities of 0.11-0.29 mole/kg have been obtained with these materials.

U.S. Pat. No. 5,214,019 awarded to Nalette, et al. on May 25, 1993 discloses a process to enhance carbon dioxide sorption rates by the use of hygroscopic additives.

The aforementioned patents report processes using modified alumina, hydrotalcite, and double salts to remove $CO_2$ in the temperature range of 100° C. to 500° C. However, the $CO_2$ sorption capacities of these processes, as determined by thermogravimetric analyses (TGA) utilizing milligram-level quantities, are very low. The results of flow reactor studies have not been reported.

None of these patents disclose an effective and regenerable sorbent for $CO_2$ capture in the temperature range of 100° C. to 500° C., nor any method or process for fabricating such a sorbent. In addition, these patents do not disclose the use of a sorbent containing a combination of alkali compounds with alkaline-earth metal oxides and/or alkaline-earth metal hydroxides.

A need exists in the art for a process to produce sorbents with wide capabilities in warm- and hot-gas cleanup. In addition, the sorbent should be easily regenerated at higher temperatures for use in additional sorption/desorption cycles. Finally, the materials used in sorbent preparation should be inexpensive, and should have very high $CO_2$ sorption capacities over the prior art.

SUMMARY OF INVENTION

An object of the present invention is to provide a method for synthesizing moderate- and high-temperature $CO_2$ sorbents that overcomes many of the disadvantages of the prior art.

Another object of the present invention is to provide a new method for synthesizing $CO_2$ sorbents which will be effective at temperatures in excess of 100° C. A feature of the invention is the use of alkali metal- and alkaline-earth metal-containing moieties. An advantage is that the new method is inexpensive.

Still another object of the present invention is to provide a method for creating many different $CO_2$ absorbing materials using solid substrates whereby the different materials can satisfy different needs. A feature of the invention is the use of sodium hydroxide (NaOH) as the key active ingredient. An advantage of the invention is that a greater range of $CO_2$ sorbing capabilities can be provided.

Yet another object of the present invention is to provide a method which produces sorbents which absorb over a wide range of temperatures. A feature of the invention is that the sorbents provided by this method sequester $CO_2$ at temperatures from as low as 25° C. to as high as 500° C. An advantage of the invention is that these sorbents can absorb at temperatures well above normal ambient temperatures, and retain the absorbed gases at these temperatures.

Another object of the present invention is to provide a method which gives a high temperature sorbent which is easily regenerated through many cycles. A feature of the invention is that regeneration of the sorbent can be accomplished by heating at about 350° C.-700° C. An advantage of the invention is that the in situ regeneration process is inexpensive. Another advantage of the invention is that the sorbent replacement and disposal costs are low.

Yet another object of the present invention is to provide a method which produces thermally stable, high-temperature sorbents. A feature of the invention is that the sorbents provided by this method can be heated to temperatures up to 700° C. with little or no degradation. An advantage of the invention is that these sorbents have a longer life span of usefulness, resulting in lower costs.

Still another object of the present invention is to provide a method which produces sorbents wherein the sorbent has superior sorption capabilities. A feature of the invention is that the sorbents produced by this method absorb up to 38 times more gas than current methods. An advantage of the invention is that the capture capacities are rendered in a smaller sorbent volume. Another advantage is that sorbents with high sorption capacity require less energy during regeneration overall because the regenerations have to be performed less often.

Briefly, the invention provides a process for producing $CO_2$ sorbents for use at temperatures up to 600° C., the process comprising homogeneously mixing a reactive substrate containing an alkali metal with an alkaline earth metal-containing moiety to form a mixture; adding water to the mixture; and drying the mixture.

The invention also provides a method for the removal of compounds from fluids comprising contacting the fluids with a solid sorbent substrate at temperatures in excess of 100° C.

In addition, the invention provides a sorbent comprising an alkali metal-based moiety (preferably sodium) and an alkaline earth metal-based moiety (preferably calcium), wherein the sorbent has a surface area of approximately two meters$^2$/gram.

BRIEF DESCRIPTION OF THE DRAWING

The invention together with the above and other objects and advantages will be best understood from the following detailed description of the preferred embodiment of the invention shown in the accompanying drawings, wherein:

FIG. 1 is a graph of the outlet concentration of $CO_2$ as a function of time from a simulated IGCC gas stream on invented sorbent A at 315° C., in accordance with features of the present invention;

FIG. 2 is a graph of the moles of $CO_2$ per kilogram (kg) of sorbent isolated from simulated IGCC gas stream on a first invented sorbent (sorbent A) over time, in accordance with features of the present invention;

FIG. 3 is a graph of outlet $CO_2$ concentration in a ten-sorption cycle test with the first invented sorbent (sorbent A) over time, in accordance with features of the present invention;

FIG. 4 is a graph of the moles of $CO_2$ captured from simulated IGCC gas stream on the first invented sorbent (sorbent A) at cycle 5 over time, in accordance with features of the present invention;

FIG. 5 is a graph of the moles of $CO_2$ sequestered from simulated IGCC gas stream on the first invented (sorbent A) sorbent at cycle 10 over time, in a controlled environment, in accordance with features of the present invention;

FIG. 6 is a graph of outlet $CO_2$ concentration from a simulated IGCC gas stream after treatment with calcium oxide (CaO) over time, in accordance with features of the present invention;

FIG. 7 is a graph of outlet concentration of $CO_2$ from a simulated IGCC gas stream after treatment with the first invented sorbent (sorbent A) at 25° C. over time, in accordance with features of the present invention;

FIG. 8 is a graph of the outlet concentration of $CO_2$ from a simulated IGCC gas stream after contact with another (sorbent B) invented sorbent (cycles 1 and 2) at 315° C. over time, in accordance with features of the present invention;

FIG. 9 is a graph of the outlet concentration of $CO_2$ from a simulated IGCC gas stream after treatment with a third (sorbent C) invented sorbent (cycles 1 and 2) at 315° C. over time, in accordance with features of the invention;

FIG. 10 is a graph of the outlet concentration of $CO_2$ from a simulated IGCC gas stream after contact with a fourth (sorbent D) invented sorbent (cycles 1 and 2) at 315° C., in accordance with features of the present invention;

FIG. 11 is a graph of the outlet concentration of $CO_2$ of a simulated IGCC gas stream after contact with a fifth (sorbent E) invented sorbent (cycles 1 and 2) at 315° C., in accordance with features of the present invention;

FIG. 12 is a graph of the outlet concentration of $CO_2$ from a simulated IGCC gas stream after contact with the fifth (sorbent E) invented sorbent (one cycle) at 500° C., in accordance with features of the present invention;

FIG. 13 is a graph of outlet concentration of $CO_2$ from a simulated IGCC gas stream contacted with a sixth invented sorbent (sorbent F), in accordance with features of the present invention.

FIG. 14 is a graph of outlet concentration of $CO_2$ from a gas mixture with 28% $CO_2$ in helium (similar to post water-gas shift reactor gas) contacted with a seventh invented sorbent (sorbent G) at 100° C., in accordance with features of the present invention.

FIG. 15 is a graph of outlet concentration of $CO_2$ from a gas mixture with 28% $CO_2$ in helium (similar to gas from post water-gas shift reactor gas) contacted with an eighth invented sorbent (sorbent H) at 100° C., in accordance with features of the present invention.

FIG. 16 is a graph of thermogravimetric data for $CO_2$ sorption on sodium titanate at 300° C. and regeneration at 600° C. with six sorption/desorption cycles, in accordance with features of the present invention;

FIG. 17 is a graph of outlet concentration of $CO_2$ from a simulated IGCC gas stream after contact with sodium titanate at 500° C., in accordance with features of the present invention;

FIG. 18 is a graph of thermogravimetric data for $CO_2$ sorption on sodium zirconium oxide at 500° C. and regeneration at 700° C. with ten sorption/desorption cycles, in accordance with features of the present invention;

FIG. 19 is a graph of outlet concentration of $CO_2$ from a simulated IGCC gas stream exposed to sodium zirconium oxide at 315° C., in accordance with features of the present invention;

FIG. 20 is a graph of outlet concentration of $CO_2$ from a simulated IGCC gas with 5% steam contacted with a ninth invented sorbent (sorbent I), in accordance with features of the present invention; and FIG. 21 is a graph of outlet concentration of $CO_2$ from a simulated post water-gas shift reactor gas contacted with the ninth invented sorbent (sorbent I), in accordance with features of the present invention.

DETAILED DESCRIPTION OF THE INVENTION

The invented process provides for alkali-based sorbents which sorb gases in a range of temperatures from about ambient temperature, i.e. 25° C., to 600° C. The reactions involved in the invented process are not limited to the surface of the sorbent. As such, sorption properties of the invented sorbent are independent of its dimensions. Rather, the sorption properties are effected by the area of the reactive surfaces of the sorbent, including the exterior surfaces of the sorbent and the interior surfaces of the sorbent, in fluid communication with the sorbent's environs.

The term "sorption" is defined herein to include both "adsorption" and "absorption" processes. The sorbents are viable at moderate temperatures (250° C.-350° C.), which makes IGCC systems more energy efficient.

The invented process can be used to prepare a variety of different sorbents. In one embodiment a process is provided for preparing sodium-based sorbents to capture and isolate $CO_2$ from gas streams by chemical absorption. The sodium is provided to react with $CO_2$ to form sodium carbonates. A salient feature of the invented sorbent is the combination of sodium with other materials not reactive with sodium. As a result of this combination, the sodium-based sorbent does not degenerate at temperatures from 400° C. upward in the absence of $CO_2$.

The sorbents produced by the invented process can remove carbon dioxide from a concentration level of 12 to 28 percent (volume) to as low as 5 parts per million volume (ppmv). The $CO_2$ sorption capacities of the sorbents are in the range of 4 to 6 moles of $CO_2$/kilogram (kg) when tested at 315° C. with a simulated gas stream representing an IGCC coal gas stream and also with $CO_2$-containing gas streams simulating post water-gas shift reactor gas. These demonstrated capacities are 7 to 10 times higher than the capacities rendered by commercially available sorbents and processes.

Some sorbents produced by the invented process display increased sorption capacities after multiple use/regeneration cycles.

The inventor has found that inasmuch as the invented sorbents operate at temperatures ranging from 25° C. to 600° C., the outlet temperature of a typical gas stream does not have to be decreased before sorbent treatment. This increases the thermal efficiency of environmental cleanup processes. Further, the treated hot gas can be used directly in turbines and other systems after removal of the carbon dioxide.

While the sorbents are designed with the IGCC process in mind, the sorbents are usable at temperatures ranging from ambient (i.e., 25° C.) to 600° C., with 100° C. to 500° C. being a preferred range. As such, the following data utilizing IGCC simulated streams should not be construed as limiting the application of the invented substrate, but merely provide an illustration of the broad utility of the invention.

In the solid (or nonaqueous) sorbent phase at the IGCC gas stream temperature (i.e., approximately 300° C.), sodium hydroxide (NaOH) reacts with $CO_2$ to produce sodium carbonate ($Na_2CO_3$) according to Equation 1:

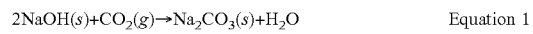

$$2NaOH(s) + CO_2(g) \rightarrow Na_2CO_3(s) + H_2O \qquad \text{Equation 1}$$

The carbonate product can be thermally decomposed to release carbon dioxide and regenerate the sodium hydroxide sorbent according to the reaction depicted in Equation 2.

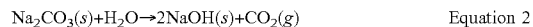

$$Na_2CO_3(s) + H_2O \rightarrow 2NaOH(s) + CO_2(g) \qquad \text{Equation 2}$$

Alternately, the reaction depicted in Equation 2 can occur in two reaction steps as shown in Equations 3 and 4.

$$Na_2CO_3(s) \rightarrow Na_2O(s) + CO_2(g) \qquad \text{Equation 3}$$

$$Na_2O(s) + H_2O \rightarrow 2NaOH(s) \qquad \text{Equation 4}$$

The reaction depicted in Equation 2 is the reverse of the reaction depicted in Equation 1.

Alkali metal hydroxide is the reactive component in these sorbents. Alkali metal hydroxides react with $CO_2$ readily to form carbonates. However, the use of NaOH alone should be avoided since it is extremely corrosive and melts around 300° C. The inventors have found that inert material like CaO may be used with NaOH. As such, the majority of the invented sorbents contain sodium hydroxide, as the principal active moiety, and calcium oxide (CaO, quicklime). The reactive moieties can include other sodium compounds such as sodium oxide, sodium peroxide, sodium silicates, and sodium aluminates. Still other materials are added primarily to serve as binders for the sodium hydroxide and calcium oxide.

The NaOH to CaO mass ratio can vary from 1:1 to 1:10 with 1:3 to 1:6 being a preferred range. Other Group I alkali metals such as lithium (Li), potassium (K), rubidium (Rb), and cesium (Cs) can be used in place of sodium.

Various binder materials are added to some sorbent formulations to enhance the strength of the sorbent pellets.

For applications where $CO_2$ sorption/desorption takes place at temperatures in the range of 100° C. to 400° C., the sorbents containing sodium compounds and magnesium hydroxide ($Mg(OH)_2$) are suitable. The sodium compound to $Mg(OH)_2$ mass ratio should be below 1:6 with a ratio of 1:10 being preferred. In these sorbents, $Mg(OH)_2$ reacts with $CO_2$ at 100° C. as depicted in Equation 5.

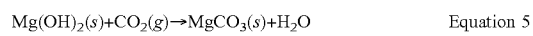

$$Mg(OH)_2(s) + CO_2(g) \rightarrow MgCO_3(s) + H_2O \qquad \text{Equation 5}$$

The sorbent can be regenerated at 350° C. by decomposing magnesium carbonate according to the reaction as depicted in Equation 6.

$$MgCO_3(s) \rightarrow MgO(s) + CO_2(g) \qquad \text{Equation 6}$$

Magnesium oxide can be rehydroxylated as shown in Equation 7, thus completing the regeneration cycle.

$$MgO(s) + H_2O \rightarrow Mg(OH)_2(s) \qquad \text{Equation 7}$$

Sorbent Formulations Detail with Calcium Oxide (CaO) and Sodium Hydroxide (NaOH)

Solid sorbents are prepared utilizing substrates and solids that are reactive chemically with $CO_2$. These solids are combined with inert, binder materials such as starch, calcium aluminate, sodium ortho silicate, calcium sulfate dihydrate, bentonite, inorganic clays, and organic binders. Suitable organic binders include, but are not limited to, hydroxypropyl methyl cellulose, molasses, starch, poly vinyl acetate, cellulose, hydroxypropyl cellulose, lignin sulfonate, and combinations thereof.

Generally, the reactive solids comprise more than 10 percent of the total mass of the sorbent. The operational temperature range for the resulting sorbents is from about 25° C. to 600° C. with a preferred range for hot gases of 100° C. to 500° C. The sorbents can be regenerated at 700° C. Generally, surface areas of the resulting sorbents range from 2 $m^2/g$ to 4 $m^2/g$.

Suitable reactive substrates and solids used as constituents in the sorbent foundation are inorganic and include, but are not limited to, alkali metal oxides, alkali metal hydroxides, alkaline earth metal oxides, and alkaline earth metal hydroxides. Exemplary species of these alkali earth materials include, but are not limited to, $Mg(OH)_2$, CaO, $Ca(OH)_2$, MgO, and others. Alkaline earth (Group II) metals such as beryllium (Be), magnesium (Mg), calcium (Ca), strontium (Sr), barium (Ba) and radium (Ra) can be used in the alkaline earth-containing moiety.

The solids are homogeneously mixed with the binding materials and water utilizing a mixer-pelletizer or a ball mill. The wet granules are heated in a drying oven to obtain dry pellets. As a result of this process, solid granules or pellets naturally form, of a size from about 1 to 2 millimeters (mm). The granules can be made to any size desired. If extrudates are desired, an extruder may be utilized for preparation.

Inert materials for use as binders for the instant sorbents include, but are not limited to, sodium silicate ($Na_4SiO_4$), calcium sulfate dihydrate ($CaSO_4 \cdot 2H_2O$), mixtures of alkali silicates (such as Cerama-Bind™ 642 marketed by Aremco Products, Inc., Valley Cottage, N.Y.), calcium aluminate ($CaAl_2O_4$), bentonite, inorganic clays and organic clays. Binder material should not react with the reactive material and should be able to withstand high temperatures (up to 900° C.) while providing high strength to the pellets.

The following examples are for illustrative purposes only.

1. Sorbent Formulations with Sodium-Containing Compounds

Sorbent A

Twenty grams (g) of sodium hydroxide and 40 grams of calcium oxide were homogeneously mixed in a mixer. Five milliliters (mL) of water were added to the mixture to form granules as was done with all subsequent examples. The resulting mixture was heated in an oven at 100° C. for one hour, and subsequently heated at 700° C. for an additional two hours as was done for all subsequent examples.

Sorbent B

Forty grams of calcium oxide, 20 g of sodium hydroxide, water and 5 g of bentonite were combined as in Example A.

Sorbent C

Calcium oxide, sodium hydroxide, water, and 5 g of calcium aluminate were combined as before.

Sorbent D

Calcium oxide, sodium hydroxide, water, and 5 g of sodium ortho silicate were combined as before.

Sorbent E

Twenty grams of calcium oxide, 10 g of sodium hydroxide, 10 g of bentonite, 5 g of anhydrous white (not cobalt-impregnated) calcium sulfate desiccant (20 to 40 mesh), 10 g of calcium sulfate dihydrate, and water were combined as before.

2. Sorbent Formulation Containing Cesium Hydroxide (CsOH)

Sorbent F

Ten grams of cesium hydroxide (CsOH), 30 g of calcium oxide, and water were combined as before.

3. Sorbent Formulations Containing Sodium Compounds and Magnesium Hydroxide.

Sorbent G

One gram of sodium hydroxide, 10 g of magnesium hydroxide ($Mg(OH)_2$), and water were combined as before.

Sorbent H

One gram of sodium ortho silicate, 10 g of magnesium hydroxide, and water were combined as before.

4. Sorbent Formulations for High Pressure Tests

Sorbent I

Fifteen grams of sodium hydroxide, 60 g of calcium oxide, and 20 mL of Cerama-Bind™ 642 binder (Aremco Products, Inc.), which contains sodium ortho silicate. Pellets were heated in an oven at 100° C. for one hour, and subsequently at 700° C. for one additional hour.

Sorbent Tests

Sorbents A-E were tested in an atmospheric flow microreactor (Micromeritics Autochem 2910, Norcross, Ga.). Sorbents were placed in the flow microreactor and a simulated IGCC gas mixture was introduced to the sorbent at 315° C. and at a total flow rate of 5 cubic centimeters per minute (cc/min). The gas mixture was 12% volume (v) $CO_2$, 35.9% v CO, 27.1% v $H_2$, and 25% v He and was bubbled through water at 25° C., to saturate the gaseous mixture with water vapor. The outlet gaseous mixture was analyzed by a Pfeiffer Vacuum Thermostar mass spectrometer (Nashua, N.H.).

The particular composition of the simulated IGCC gas mixture used in the tests simulated Chevron-Texaco IGCC gas and the temperature of 315° C. Regeneration was performed utilizing air or 5% oxygen ($O_2$) in helium in the presence of water vapor at temperatures between 700° C. and 750° C. The presence of water vapor either during regeneration or during cooling of the sorbent prior to the subsequent sorption cycle is preferred to facilitate rehydroxylating the reactive compounds.

For all sorbent tests described infra, "breakthrough" (i.e., the sorbent saturation point) of $CO_2$ was defined as having a minimum $CO_2$ gas concentration of ~1% v of the outlet gas coming from above the sorbent in use. Inlet $CO_2$ gas concentrations used were typically ~12% v of the total gas volume passed over the sorbents.

After sorbent saturation levels are reached, the sorbent remains in stasis with its environment, absorbing or desorbing no $CO_2$. Rather, desorption occurs only upon regeneration at temperatures in excess of 350° C. to 700° C.

The simulated IGCC gas stream was always at 1 atmosphere (atm) for all tests with sorbents A-E.

The sorbent tests were also conducted with a gas mixture containing a high concentration of $CO_2$ (27.3%) which is similar to the concentration of $CO_2$ in post water-gas shift reactor gas.

The sorbent tests with cesium-containing sorbent F was conducted at 315° C. at conditions similar to the tests with sorbents A-E. However, the regeneration of sorbent F was conducted at temperatures between 600° C. and 650° C.

The sorbent tests with magnesium hydroxide-containing sorbents G and H were conducted at 100° C. with a gas mixture containing 28% $CO_2$ in helium gas saturated with water vapor. Gas flow rates were similar to those in tests with sorbents A-E. The regeneration of sorbents G and H were performed at 350° C.

1. Sorbent A

The amount of sorbent A used for the data presented in the three subsequent figures was 0.95 grams (g). Surface area of the sorbent was approximately 2 $m^2$/gram.

FIG. 1 is a graph of the outlet concentration (v %) of gas of $CO_2$, as a function of time. The gas mixture is exposed to sorbent at point X. The gas is typically fed at pressures ranging from 1.5 atm to 2.5 atm. The reactor pressure is maintained at 1 atm thereby creating a pressure gradient to induce gas flow over the sorbent. Initially, the gas mix bypasses the sorbent so as to establish a steady flow baseline with initial 12 percent $CO_2$. At point X, the switching valve re-directs the gas to flow through the reactor. As the gas flow continues, near the end of the curve, the slopes of the curves increase due to more $CO_2$ flowing through as a result of oncoming saturation of the sorbent and lack of availability of active sites for absorption. Thus, "breakthrough" occurs at point Y after approximately 90 minutes of exposure of the gas to the sorbent.

The $CO_2$ concentration in the gas stream decreased from 12 percent v to less than 1 percent (parts per million volume (ppmv) range) upon contact of the stream with the sorbent. The $CO_2$ removal efficiency of sorbent A is greater than 99% as the outlet $CO_2$ level remained in the ppm range for about 83 minutes.

FIG. 2 is a graph of moles of $CO_2$, captured per kilogram of sorbent A as a function of time. As before, the sorbent was exposed to the gas mixture at point X. After about 80 minutes, the curve begins to decline in slope with around 2.5 moles of $CO_2$ sorbed per kilogram of sorbent.

FIG. 3 is a graph of a ten-sorption cycle test of sorbent A with regard to $CO_2$ sorption from a simulated IGCC gas stream, as a function of time. $CO_2$ concentration shown is volume percent of the treated IGCC gas streams after breakthrough. Point X designates time of introduction of gas to sorbent.

FIG. 4 is a graph of the moles of $CO_2$ sorbed per kilogram (kg) of sorbent from simulated IGCC gas stream on regenerated sorbent A (cycle 5) at 315° C., as a function of time. FIG. 5 is a graph of the moles of $CO_2$ isolated per kilogram (kg) of sorbent from simulated IGCC gas stream on regenerated sorbent A (cycle 10) at 315° C., as a function of time, in a controlled environment. Comparison of FIG. 5 with the graph of FIG. 4 shows no degradation of sorbent effectiveness as the number of cycles increases.

FIG. 6 is a graph of outlet $CO_2$ concentration from a simulated IGCC gas stream after passage over CaO at 315° C., as a function of time. While calcium oxide has some capacity for carbon dioxide sorption, its capacity is significantly less than that of alkali metal hydroxides, with breakthrough occurring after about eight minutes.

FIG. 7 is a graph of outlet concentration of $CO_2$ from a simulated IGCC gas stream after passage over sorbent A at 25° C. as a function of time. FIG. 7 shows that Sorbent A displays considerable carbon dioxide sequestration capacity even at temperatures around 25° C.

2. Sorbent B

The amount of sorbent B used herein was 0.9 g.

FIG. 8 is a graph of the outlet concentration of $CO_2$ from a simulated IGCC gas stream after passage over sorbent B (cycles 1 and 2) at 315° C., as a function of time. Breakthrough occurred during cycle 1 only after more than 50 minutes, and during cycle 2 after more than 40 minutes. The sorbent was able to capture 1.7 moles $CO_2$/kg of the sorbent from the flowing gas.

3. Sorbent C

The amount of sorbent C used herein was 2.05 g.

FIG. 9 is a graph of the outlet concentration of $CO_2$ from a simulated IGCC gas stream after treatment with sorbent C (cycles 1 and 2) at 315° C. as a function of time. Breakthrough occurred during cycle 1 after about 67 minutes, and during cycle 2 after about 64 minutes. Sorbent C isolated 0.9 moles $CO_2$/kg sorbent.

4. Sorbent D

The amount of sorbent D used for FIG. 10 was 2.16 g.

FIG. 10 is a graph of the outlet concentration of $CO_2$ from a simulated IGCC gas stream after its contact with sorbent D (cycles 1 and 2) at 315° C.

For sorbent D, breakthrough occurred for cycle 1 after more than 43 minutes, and for cycle 2 after more than 75 minutes. The inventors surmise that the sodium ortho silicate binder provides a means to facilitate absorption of water necessary for rehydroxylation to form NaOH. As such, sorbent D yields higher sorbent capture capacities in subsequent cycles.

Sorbent D sorbed 0.6 moles $CO_2$/kg sorbent.

5. Sorbent E

The amount of sorbent E used for the data presented in FIG. 11 was 1.65 g.

FIG. 11 is a graph of the outlet concentration of $CO_2$ of a simulated IGCC gas stream after passage over sorbent E (cycles 1 and 2) at 315° C.

For sorbent E, breakthrough occurred for cycle 1 after more than 65 minutes, and for cycle 2 after more than 95 minutes. Sorbent E displays a greater sorption capacity after additional heating at high temperatures.

Sorbent E sequestered 1.7 moles $CO_2$/kg sorbent from the IGCC gas stream.

FIG. 12 is a graph of the outlet concentration of $CO_2$ from a simulated IGCC gas stream after treatment with sorbent E (one cycle) at 500° C.

6. Sorbent F

The amount of sorbent F used in tests was about 1.0 g. FIG. 13 is a graph of sorption of $CO_2$ from a simulated gas stream on sorbent F (cesium hydroxide/calcium oxide) at 315° C. Sorbent F captured 1.2 moles $CO_2$/kg sorbent.

7. Sorbent G

The amount of sorbent G used in FIG. 14 was 1.18 g.

FIG. 14 is the graph of concentration of $CO_2$ of the gas composition containing 28% $CO_2$ in helium after passage over sorbent G (one cycle) at 100° C.

The breakthrough times are shorter because initial $CO_2$ concentration is higher than that of simulated IGCC gas streams. The breakthrough occurred around 6 minutes in the first cycle, approximately 3.5 minutes in the second cycle and 3 minutes in the third cycle.

Sorbent G isolated 0.2 moles $CO_2$/kg sorbent.

8. Sorbent H

The amount of sorbent H used in FIG. 15 was 0.98 g.

FIG. 15 is the graph of outlet concentration of $CO_2$ of gas stream composed of 28% $CO_2$ in helium after passage over sorbent H at 100° C. The breakthrough times were 11 minutes in the first cycle and 9 minutes in the second cycle. Sorbent H demonstrated a sorption capacity of 0.65 moles $CO_2$/kg sorbent. It is expected to capture more $CO_2$ at high pressure, inasmuch as the reaction depicted in Equation 5 is favored at the high pressures stated herein.

9. Sodium Titanate

The mass of sodium titanate used herein was 35 milligrams (mg).

FIG. 16 is a graph of thermogravimetric data for $CO_2$ sorption on sodium titanate ($Na_2TiO_3$) at 300° C. with six sorption/desorption cycles. The box-shaped curves in FIG. 16 designate temperatures during sorption/desorption cycles; wherein the bottom of the boxes represent temperature at sorption stages and the top of the boxes depict temperature at desorption stages. The other curves depict sample mass gain from points X to Y during the sorption cycles and mass loss from points "Y" to "X" during regeneration cycles. As such, "X" designates that initiation of the sorption cycle and "Y" indicates the initiation point of the regeneration cycle.

FIG. 17 is a graph of sorption of $CO_2$ from a simulated IGCC gas stream on sodium titanate at 500° C.

10. Sodium Zirconium Oxide

The amount of sodium zirconium oxide used in the tests of FIG. 15 was almost 66 milligrams (mg).

FIG. 18 is a graph of thermogravimetric data for $CO_2$ sorption on sodium zirconium oxide ($Na_2ZrO_3$) at 500° C. with ten sorption/desorption cycles. As with FIG. 16 supra, the box-shaped curves represent temperature during sorption/desorption cycles; whereas, the other curves are sample mass during the same sorption/desorption cycles.

FIG. 19 is a graph of outlet concentration of $CO_2$ from a simulated gas stream on sodium zirconium oxide at 315° C. The amount of sodium zirconium oxide used for the test data displayed in FIG. 19 was about 1.0 g.

Sorbent Regeneration

Regeneration studies were carried out in a flow reactor using $N_2$ or helium as a sweep gas to regenerate sorbents. Adequate regeneration can be obtained by heating used sorbents at 700° C., typically for less than two hours. Actual individual regeneration times for each sorbent depend upon the flow rate of the feed gas sweeping over the sorbent while heating the used sorbent. The regeneration at lower temperatures of 400° C.-500° C. can be obtained in vacuum pressure. Regeneration can also be performed utilizing ambient air or 5% oxygen ($O_2$) in helium. Introduction of steam (water vapor) is preferred either during regeneration or prior to subsequent sorption cycles for the reformation of alkali metal hydroxides. Regeneration can be performed either with steam or in vacuum to obtain pure $CO_2$ gas.

FIG. 3 depicts a ten-cycle test of sorbent A. Regeneration was carried out at 700° C. while the used sorbent was purged with ambient air. There was a decrease in $CO_2$ sorption capacity as indicated by the shorter breakthrough times during the second and third cycles. The $CO_2$ sorption capacity increased at the fourth cycle and was significantly higher than the sorption capacity of the first cycle. The sorption capacity was still higher at the fifth cycle (cycle 5).

FIG. 4 is a graph of the moles of $CO_2$ sorbed per kilogram (kg) of sorbent from simulated IGCC gas stream on regenerated sorbent A (cycle 5) at 315° C., as a function of time.

After the sixth cycle, the regeneration time was increased to 2.5 hours. There was a dramatic increase in $CO_2$ capture capacity at the seventh cycle and still another significant increase at the ninth cycle, as shown by the increased breakthrough times in FIG. 3.

FIG. 5 is a graph of the moles of $CO_2$ isolated per kilogram (kg) of sorbent from a simulated IGCC gas stream on regenerated sorbent A (cycle 10) at 315° C., as a function of time. The maximum $CO_2$ sorption capacity at breakthrough at the tenth cycle is about ten moles of $CO_2$/kg of sorbent A.

The effect of binders on the performance of the sorbents is shown in FIGS. 9-11. These data indicate that the performance of sorbents was not affected by the addition of binders.

The effect of temperature on the performance of NaOH/CaO containing sorbents is shown in FIG. 7 and FIG. 12. These data indicate that these sorbents are capable of capturing $CO_2$ in a wide range of temperatures from 25° C. to 500° C.

FIG. 13 describes the performance of CsOH/CaO sorbent. This sorbent can be regenerated at a lower temperature (between about 600° C. and 650° C.) than sorbents containing NaOH/CaO, which are regenerated at 700° C.

FIG. 14 and FIG. 15 describe the performance of sorbents containing $Mg(OH)_2$ promoted with sodium-containing compounds. These sorbents capture $CO_2$ at 100° C. and regenerate at 350° C. These sorbents are suitable to applications in which lower temperature regeneration is preferred. FIG. 14 shows three sorption cycles.

FIG. 16 described supra displays six sorption/desorption cycles for $CO_2$ capture on sodium titanate ($Na_2TiO_3$) at 300° C. In the first cycle, the sorbent gains more than 2 mg of carbon dioxide. In the second cycle, the mass gain is more than 1 mg of carbon dioxide. Even in subsequent cycles, the gain of carbon dioxide is at least 1 mg.

FIG. 18 described supra displays ten sorption/desorption cycles for $CO_2$ sorption on sodium zirconium oxide ($Na_2ZrO_3$) at 500° C. The first portion of the curves shows what is evidently drying of the sorbent to a mass just below 65 mg with subsequent sorption of almost 3 mg of carbon dioxide. For the subsequent sorption/desorption cycles, the sorbent mass gain for each cycle due to sequestration of carbon dioxide goes from about 3 mg to 2 mg, with the presorption mass of the sorbent continually increasing.

The invented process is simple and quick, generates little or no waste products, thus providing an inexpensive product with little or no waste disposal problems.

The invented sorbents can be applied to an array of gaseous mixtures at temperatures as high as 600° C. The greater sorption capabilities of the sorbents gives rise to much longer breakthrough times for gases such as $CO_2$. The invented sorbents $CO_2$ removal efficiency is greater than 99 percent. As a result, the reactor vessel sizes for carbon dioxide sequestration can be dramatically reduced.

The sorbents can be easily regenerated and used for additional sorption/desorption cycles thus allowing for additional cost savings.

High Pressure Reactor Tests

Test 1

Approximately 35 grams of sorbent I was tested in a one inch diameter reactor which is operated at 280 psig (pounds per square inch gauge) (~19 atm). The gas mixture was similar to the gas composition (simulated Chevron-Texaco gas) utilized during the low pressure tests with sorbents A-H. The gas stream also contained 5% steam. The flow rate of the gas mixture was 210 sccm (standard cubic centimeters per minute). The results are shown in FIG. 20.

The sorbent was capable of reducing $CO_2$ content of the gas mixture from 12% v to less than 1% (levels in the ppmv range) at 315° C. Sorbent I demonstrated a sorption capacity of about 4.5 moles $CO_2$/kg sorbent. Breakthrough time was approximately 50 minutes.

Test 2

Approximately 300 grams of sorbent I was tested in a two inch diameter high pressure reactor which is operated at 280 psig (~20 atm) with a six-inch height sorbent bed. The space velocity of the gas was 1123 $hr^{-1}$. The gas mixture consisted of 27.3% carbon dioxide, 39.8% hydrogen, 29.8% steam and 3.1% nitrogen. This mixture simulated the gas composition after the water-gas shift reactor. The results are shown in FIG. 21.

Sorbent I was capable of capturing $CO_2$ such that $CO_2$ content of the gas mixture was reduced from 27.3% v to less than 1% (levels in the ppmv range) at 315° C. The capture capacity of sorbent I was about 6 moles $CO_2$/kg sorbent. Breakthrough time was approximately 28 minutes.

While the invention has been described with reference to details of the illustrated embodiment; these details are not intended to limit the scope of the invention as defined in the appended claims.

The embodiment of the invention in which an exclusive property or privilege is claimed is defined as follows:

1. A process for producing sorbents to capture carbon dioxide from gas streams, the process comprising:
    a) homogeneously mixing a reactive substrate selected from the group consisting of an alkali metal oxide, alkali metal hydroxide, alkaline earth metal oxide, alkaline earth metal hydroxide, alkali titanate, alkali zirconate, alkali silicate and combinations thereof with a binder;
    b) adding water to the mixture to form granules;
    c) drying the mixture at 100° C. for 1 hour;
    d) calcining the mixture at 700° C. for 2 hours; and,
    e) placing the mixture in a container permeable to a gas stream to remove carbon dioxide.

2. The process as recited in claim 1 wherein the alkali metal contains a Group I element selected from the group consisting of lithium, sodium, potassium, rubidium, and cesium.

3. The process as recited in claim 1 wherein the binder is a temperature resistant material selected from the group consisting of sodium ortho silicate, calcium sulfate dihydrate ($CaSO_4.2H_2O$), alkali silicates, calcium aluminate, bentonite, inorganic clays and organic clays.

4. The process as recited in claim 1 wherein the binder facilitates
    rehydroxylation of the alkali or alkaline earth compounds during regeneration thereby yielding higher capture capacities in subsequent absorption cycles.

5. The process as recited in claim 1 wherein the reactive substrate facilitates sequestration of carbon dioxide at temperatures ranging from 25° C. to 600° C.

\* \* \* \* \*